United States Patent
Langreck et al.

(10) Patent No.: US 12,326,184 B1
(45) Date of Patent: Jun. 10, 2025

(54) CAPTIVE CLUTCH FOR VEHICLE TRANSMISSION

(71) Applicant: Goerend Transmissions, Inc., Saint Lucas, IA (US)

(72) Inventors: Chase H. Langreck, West Union, IA (US); Allen J. Massman, Calmar, IA (US); James W. Weissenfluh, Waucoma, IA (US)

(73) Assignee: Goerend Transmissions, Inc., Saint Lucas, IA (US)

( * ) Notice: Subject to any disclaimer, the term of this patent is extended or adjusted under 35 U.S.C. 154(b) by 0 days.

(21) Appl. No.: 18/678,650

(22) Filed: May 30, 2024

(51) Int. Cl.
 *F16H 45/02* (2006.01)
 *F16H 61/02* (2006.01)
 *F16H 61/14* (2006.01)

(52) U.S. Cl.
 CPC ..... *F16H 45/02* (2013.01); *F16H 2045/0205* (2013.01); *F16H 2045/0215* (2013.01); *F16H 2045/0284* (2013.01); *F16H 61/0206* (2013.01); *F16H 61/143* (2013.01)

(58) Field of Classification Search
 CPC ..... F16H 45/02; F16H 2045/0205–021; F16H 2045/0215; F16H 2045/0273–0294; F16H 41/30; F16H 61/0206; F16H 61/0267; F16H 61/143–14; F16H 61/48; F16H 61/64; F16D 2048/0257–0296
 See application file for complete search history.

(56) References Cited

U.S. PATENT DOCUMENTS

| | | | |
|---|---|---|---|
| 5,054,590 A * | 10/1991 | Paulsen | F16H 61/143 192/3.3 |
| 8,919,509 B2 * | 12/2014 | Maienschein | F16H 45/02 192/55.61 |
| 9,732,847 B2 * | 8/2017 | Frait | F16H 61/14 |
| 10,895,311 B2 * | 1/2021 | Derhammer | F16D 25/0635 |
| 2007/0235277 A1 * | 10/2007 | Heuler | F16H 45/02 192/3.3 |

* cited by examiner

*Primary Examiner* — James J Taylor, II
(74) *Attorney, Agent, or Firm* — McKee, Voorhees & Sease, PLC

(57) ABSTRACT

A torque converter with a lockup clutch is provided with three oil passageways in and around the input shaft. One of the oil passageways provides oil to and from the converter for locking and unlocking the clutch via a piston. The piston moves away from the front cover of the torque converter to lock or apply the clutch and moves toward the front cover to release or unlock the clutch. A hydraulic circuit with control block is in fluid communication with the torque converter housing. The control block has three passages and two check valves to control fluid flow from the converter to the cooler, from the transmission to the cooler, and from the control block to the converter.

17 Claims, 34 Drawing Sheets
(8 of 34 Drawing Sheet(s) Filed in Color)

CAPTIVE CLUTCH FOR VEHICLE TRANSMISSION

TECHNICAL FIELD

The present invention is directed toward a torque converter with a lockup clutch for an automatic transmission.

BACKGROUND

Factory or original equipment transmissions, such as the Chrysler 47/48 RE transmissions, use a traditional two-passage torque converter charge and clutch lock-up system. One example of such a prior art transmission torque converter is shown in FIG. 2. The prior art torque converter 10 includes an impeller or pump 12, a turbine 14, and a stator 16. The torque converter 10 also includes a damper assembly 18, a piston 19, and clutch plates 20. When the clutch piston 19 is applied or locked, it moves towards the front cover 22, and when the clutch is released or unlocked, it moves away from the front cover 22. An input shaft 24 extends out of the transmission into torque converter 10 and is coupled to the transmission. The stator 16 is mounted on a support tube 26, which resides around the input shaft 24. A first fluid passageway A extends axially through the input shaft 24, and a second annular passageway B extends between the input shaft 24 and the stator support tube 26. The passageways A, B communicate with the conventional hydraulic circuitry for the torque converter 10, as shown in FIGS. 6 and 7.

When the lockup clutch 20 is not applied, or disengaged, the engine power is transmitted to the transmission from the fluid coupling of the torque converter 10 with the oil passage A being filled with regulated charge pressure, thereby maintaining the clutch 20 in the released position. The fluid or oil travels through the fluid coupling and exits the torque converter 10 through the second passage B, then on to the cooler 28 and the transmission lubrication circuit 30 (FIG. 7).

The lockup clutch 20 is applied or engaged by controlling the valve body, energizing the lockup solenoid 80, stroking lockup valve 81, directing line pressure to switch valve 34, thereby stroking the switch valve 34, which changes the oil fluid flow, and directs line pressure to passageway B, and opening passageway A to exhaust oil to the sump in the bottom of the transmission pan where the fluid is held and the fluid pickup filter resides, all exhaust circuits within the transmission and the lubrication circuit all drain to the sump. This change in flow direction causes the piston 19 to move toward the front cover 22 and applies the clutch 20. The fiber material of the clutch plates 20 act as a seal to separate passageways A and B from one another. Simultaneously, the torque converter charge pressure, which was regulated when the clutch is not applied, becomes unregulated, with oil flowing directly to the cooler 28 and lubrication circuit 30 (FIG. 6B).

These conventional transmissions have several problems.

1. The 2-passage torque converter 10 pressurizes the entire interior of the converter to apply the lockup clutch 20. Excessive pressure can cause the torque converter 10 to balloon and deform the impeller 12.
2. A dual passage torque converter 10 uses solid clutch linings without lubrication grooves, because the clutch acts as a seal when the torque converter is locked to separate the "apply" and "release" hydraulic circuits. If the clutch 20 becomes slightly warped from heat, or otherwise gets damaged so as to preclude a full and complete seal, oil leakage can cause loss of pressure and further clutch damage. The absence of lubrication grooves in the liner means there is less cooling and lubricating oil to pass over the clutch, and less clutch resilience and heat dissipation.
3. The torque converter 10 with only two passageways A and B, relies on oil passing through passageway A in the center of the input shaft 24 to keep the clutch piston 19 away from the cover 22 so that the clutch 20 does not drag when it is not applied. This oil flow may become restricted from lack of pump volume or other reasons, thereby causing damage to the clutch 20 and failure. Centrifugal forces in the torque converter can cause clutch dragging and damage during high RPM situations, such as spooling a turbo charger, when the release oil flow is insufficient.
4. The two-passage torque converter 10 can also have delayed lockup engagement from centrifugal forces within the converter keeping the piston 19 from applying.
5. The dual passage torque converter with the lockup clutch 20 cannot have the charge pressure drained, such as with a dump valve system, to increase the stall speed when spooling, because the clutch will drag and fail.
6. The two-passage torque converter has little or no fluid circulation while the clutch is locked, so that hot oil is trapped in the converter until the clutch unlocks, excessive heat may lead to deformation or other damage to the converter.

Accordingly, it is a primary objective of the present invention to provide an improved torque converter with a lockup clutch that overcomes the problems of conventional torque converters.

A further objective of the present invention is the provision of a torque converter with a lockup clutch having three passageways for oil flow to and from the torque converter.

Another objective of the present invention is the provision of a torque converter having three oil passageways to control oil pressure in the torque converter.

Another objective of the present invention is the provision of a torque converter with improved oil flow to prevent ballooning damage.

Still another objective of the present invention is the provision of an improved torque converter having a clutch with lubrication grooves for enhanced cooling, and thus improve clutch resilience and heat resistance.

A further objective of the present invention is the provision of torque converter with a piston that is maintained in the released position by the charge pressure, thereby preventing dragging of the clutch.

Yet another objective of the present invention is the provision of a torque converter with a lockup clutch that does not rely on the changing of fluid flow directions for lockup, so there is no potential for delayed engagement of the lockup clutch.

Still another objective of the present invention is the provision of a torque converter that allows the charge pressure to be drained or dumped, thereby increasing the stall speed while spooling the engines turbo charger without causing damage to the clutch.

A further objective of the present invention is the provision of the torque converter which allows fluid circulation at all times, to maintain lower oil temperatures inside the torque converter.

These and other objectives will become apparent from the following description of the invention.

SUMMARY

The torque converter has a housing with an impeller, a turbine, and a stator between the impeller and the turbine. A lockup clutch in the housing can be applied via a piston, which moves rearwardly, away from the front cover of the torque converter, and released when the piston moves toward the front cover. The oil circuitry controls movement of the piston, and thus locking and unlocking of the clutch. The stator is mounted upon a stator support tube, through which an input shaft extends. A first passageway extends axially through the input shaft. Oil flows in opposite directions through the input shaft when the lockup clutch is applied and released. A second passageway extends between the input shaft and the stator support tube. Oil flows in opposite directions through the second passageway when the lockup clutch is released and applied. A third passageway exists between the stator support tube and the impeller hub. Oil flows in opposite directions through the third passageway. The third passageway of the torque converter is connected to a control block which has three passages and is fluidly connected to the transmission cooler and the front cooler line of the transmission case. The first and third passageways of the control block are connected by an orifice when the lockup clutch is applied.

In an alternative embodiment, the torque converter includes a dump valve system comprising of a solenoid to actuate a valve and a solenoid valve for selectively draining oil from the torque converter to increase stall speed RPM.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figures 1, 2:
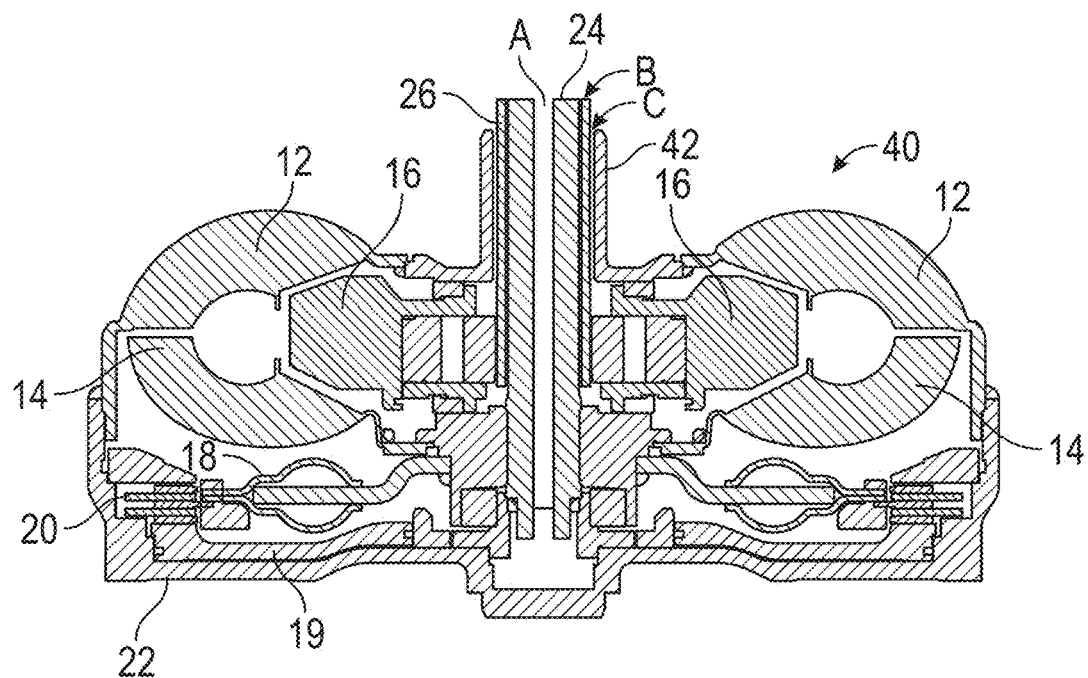
FIG. 1 is a sectional view of the torque converter with the captive clutch of the present invention.
FIG. 2 is a sectional view of a prior art torque converter.
Figure 3:
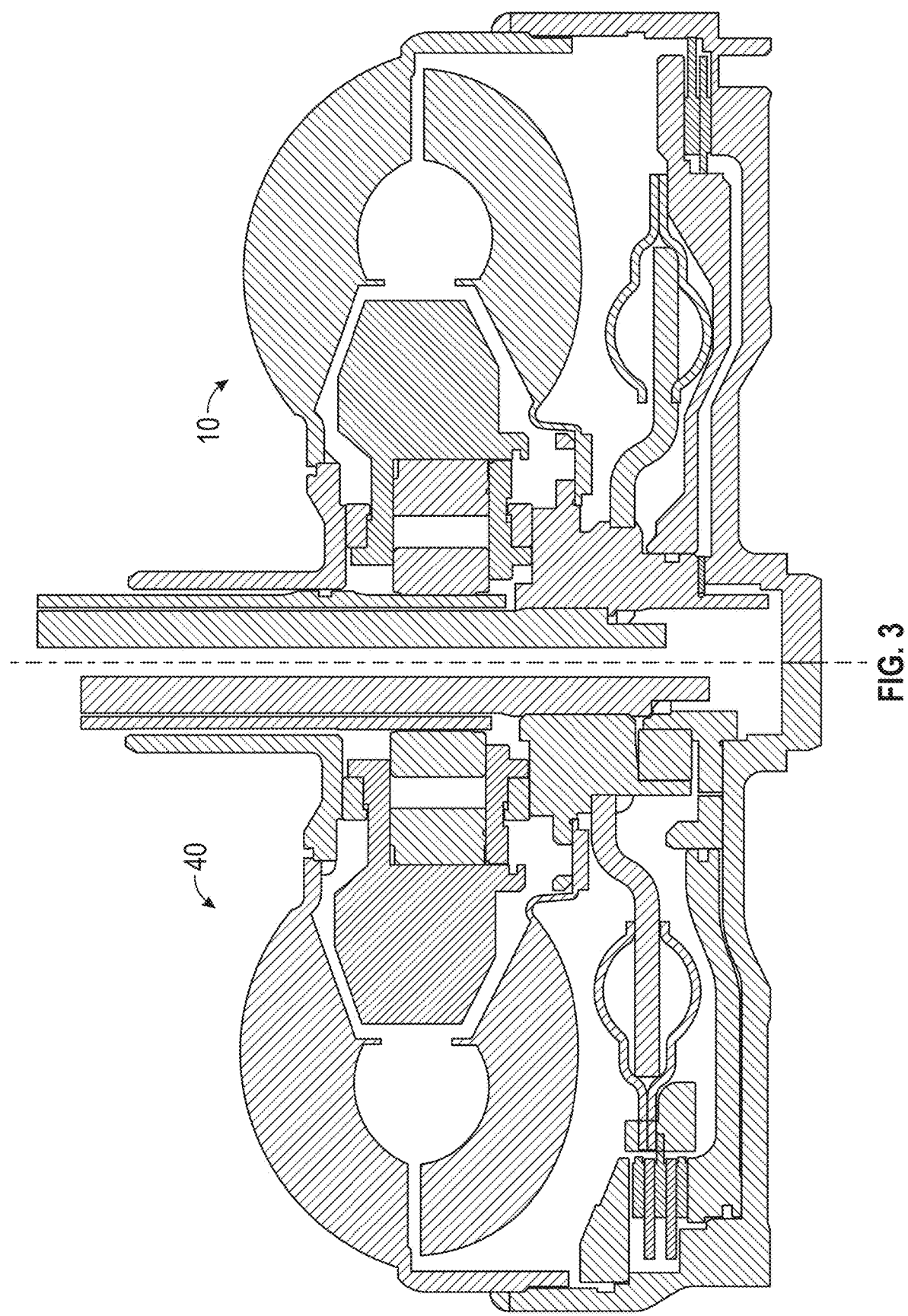
FIG. 3 is a composite sectional view showing the new torque converter on the left and the prior art torque converter on the right.

The torque converter of the present invention is generally designated by the reference numeral 40 in the drawings. The torque converter 40 has the same basic components as the prior art torque converter 10, including the impeller/pump 12, the turbine 14, and the stator 16. One of the differences between the prior art torque converter 10 and the converter 40 of the present invention is the addition of a third, annular passageway C surrounding the stator support tube 26 and inside the hub 42. The internal structure of some of the components has also been modified in the torque converter 40, as compared to the prior art torque converter 10, as seen in the side-by-side comparison of FIG. 3. For example, the piston 19 of the torque converter 40 is adjacent to the front cover 22 when the clutch is not applied, and moves away from the front cover to apply the clutch 20. In comparison, the piston of the prior art torque converter 10 moves toward the front cover 22 when the clutch 20 is applied. Also, as seen in FIG. 3, the damper assembly 18 rotates with the turbine 14 independently of the piston 19 which only motion is reciprocating in the front cover 22 to actuate lockup. In comparison, the damper assembly 18 of the prior art torque converter 10 is attached to the piston 19 and both rotate with the turbine 14.

Figure 4:
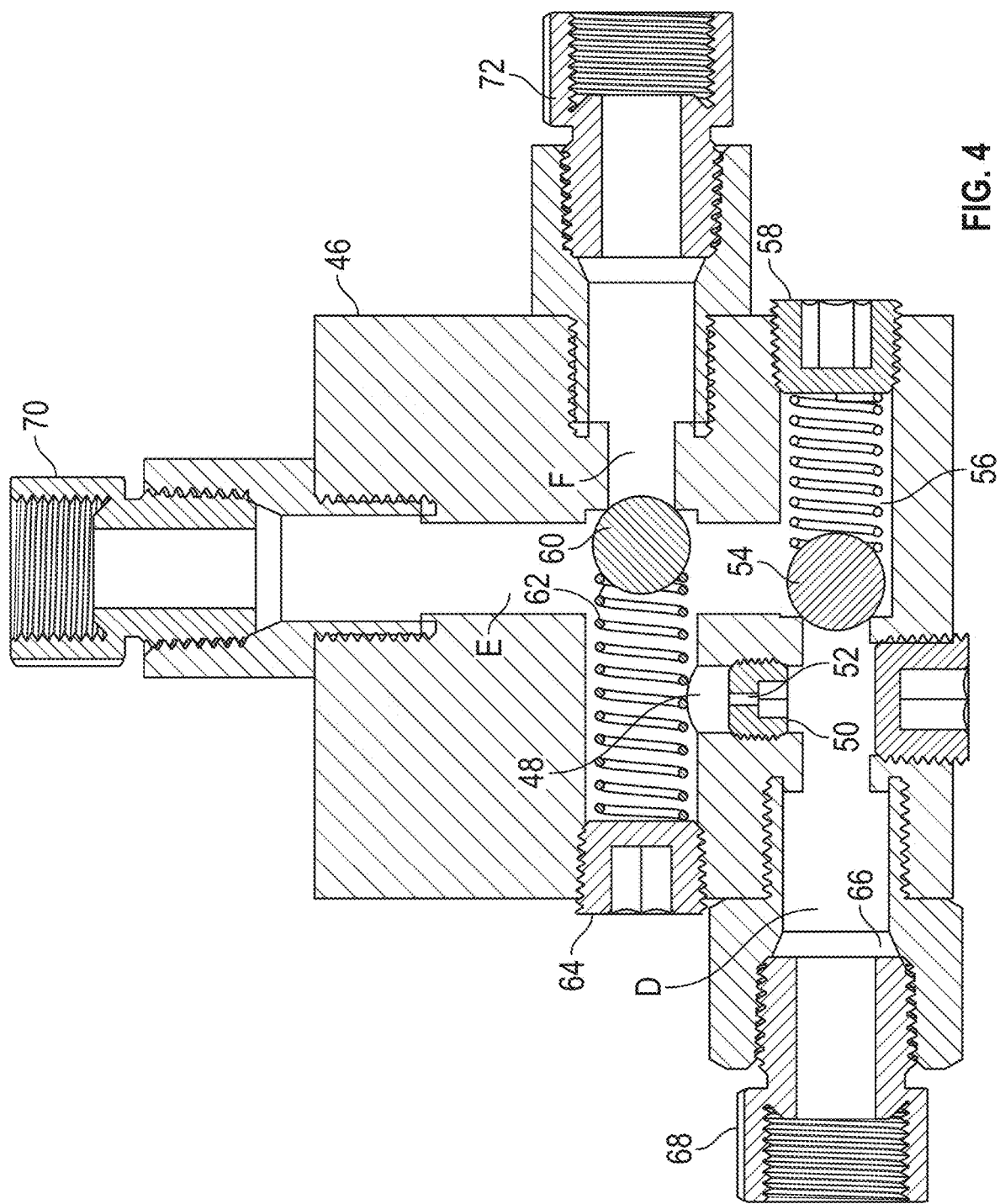
FIG. 4 is a sectional view of the cooler block of the present invention.
Figure 5:
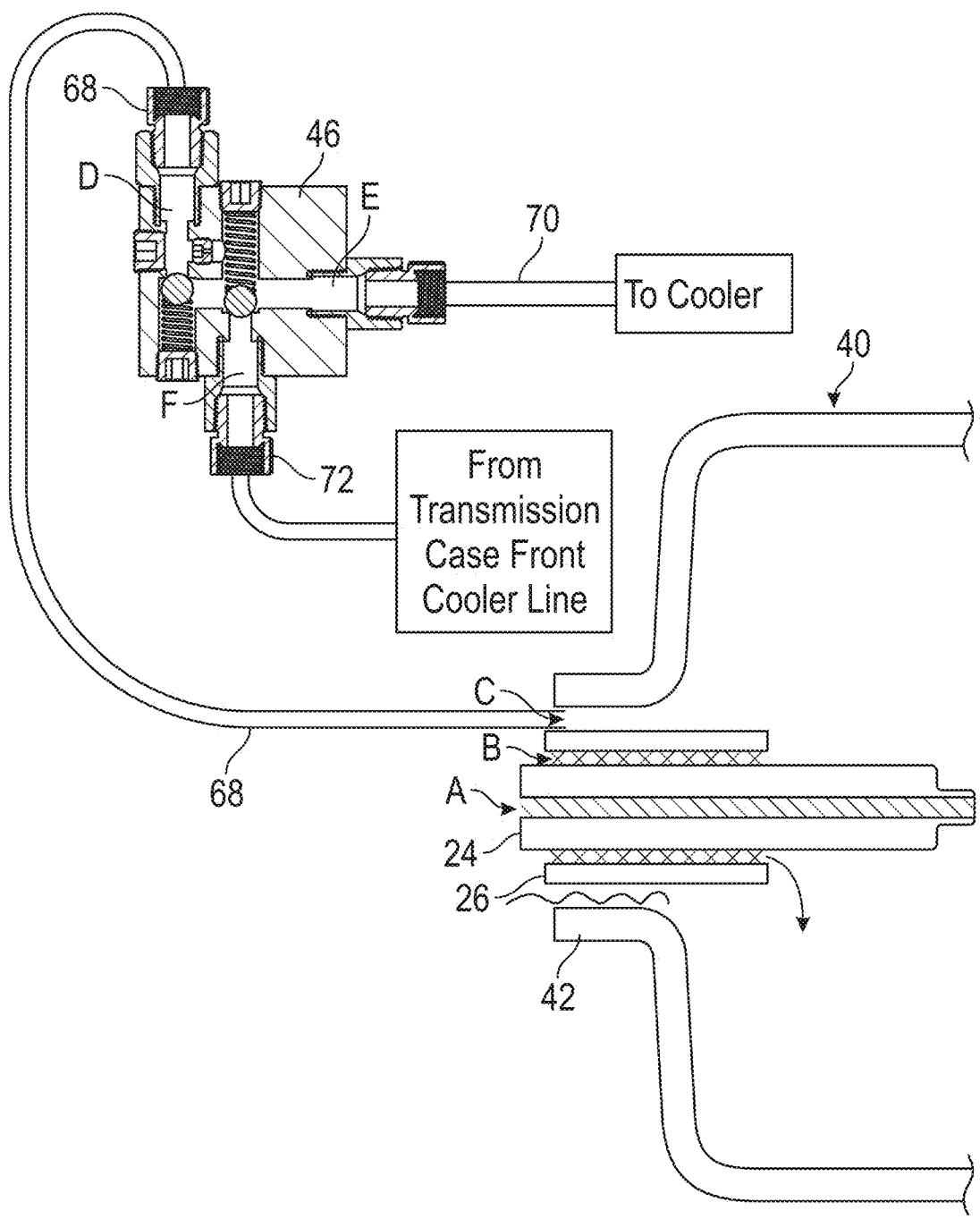
FIG. 5 is a schematic view showing a portion of the torque converter fluidly coupled to the cooler block, according to the present invention.
Figure 6A:
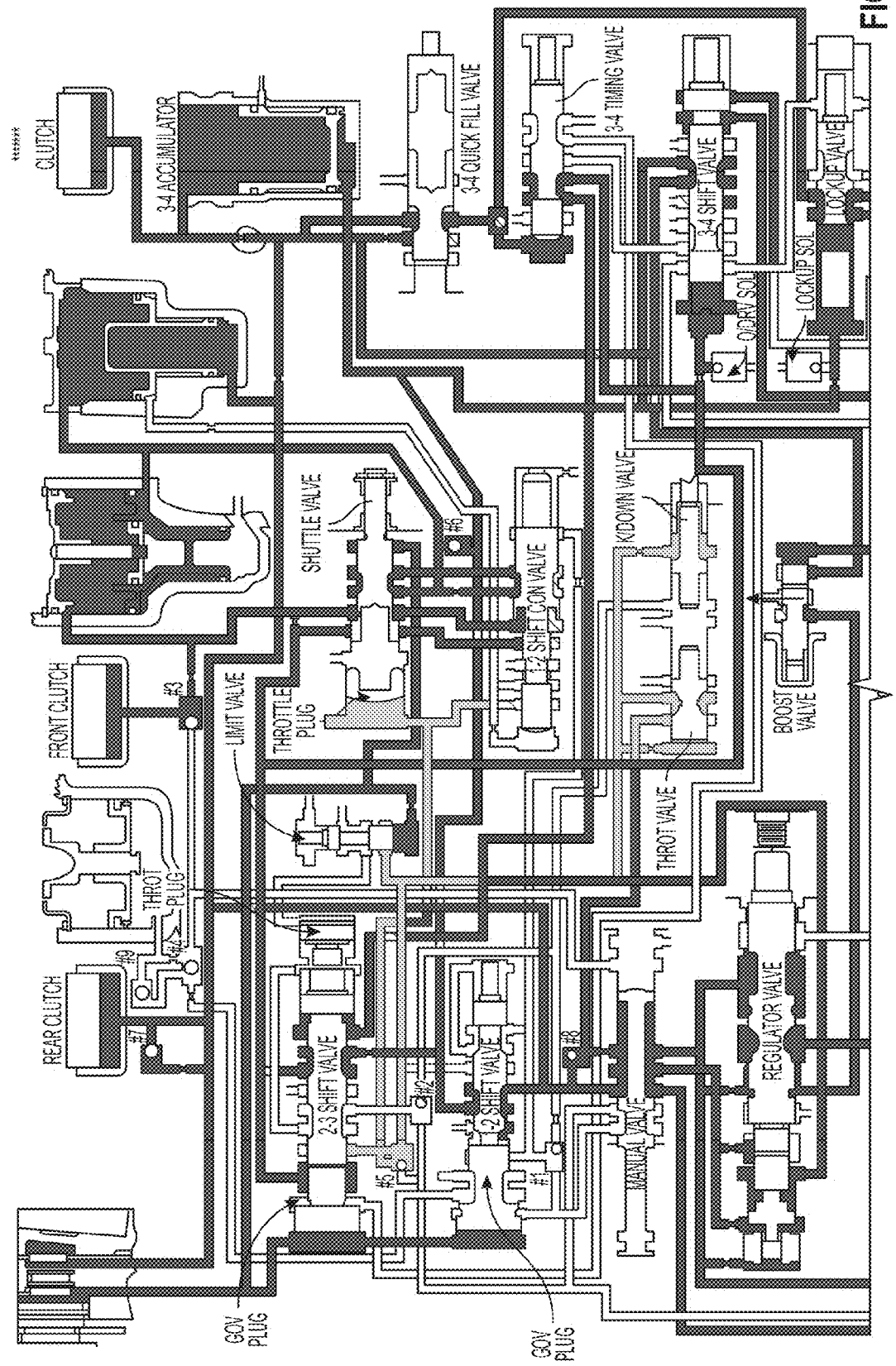
FIG. 6A is a schematic view showing a portion of the hydraulic circuitry of the prior art torque converter when the clutch is locked.
Figure 6B:
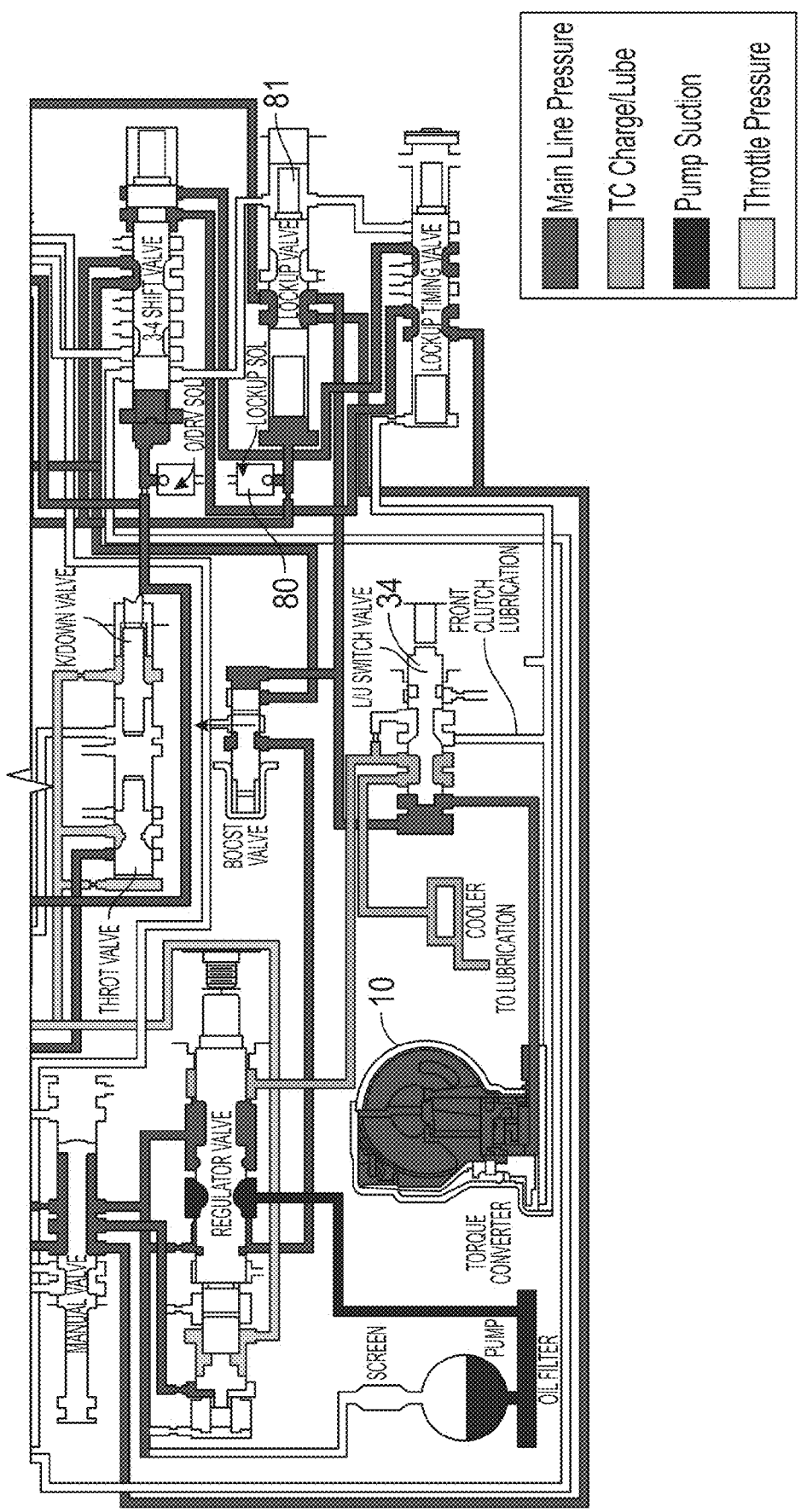
FIG. 6B is a schematic view showing a portion of the hydraulic circuitry according to the prior art when the clutch is locked.
Figure 7:
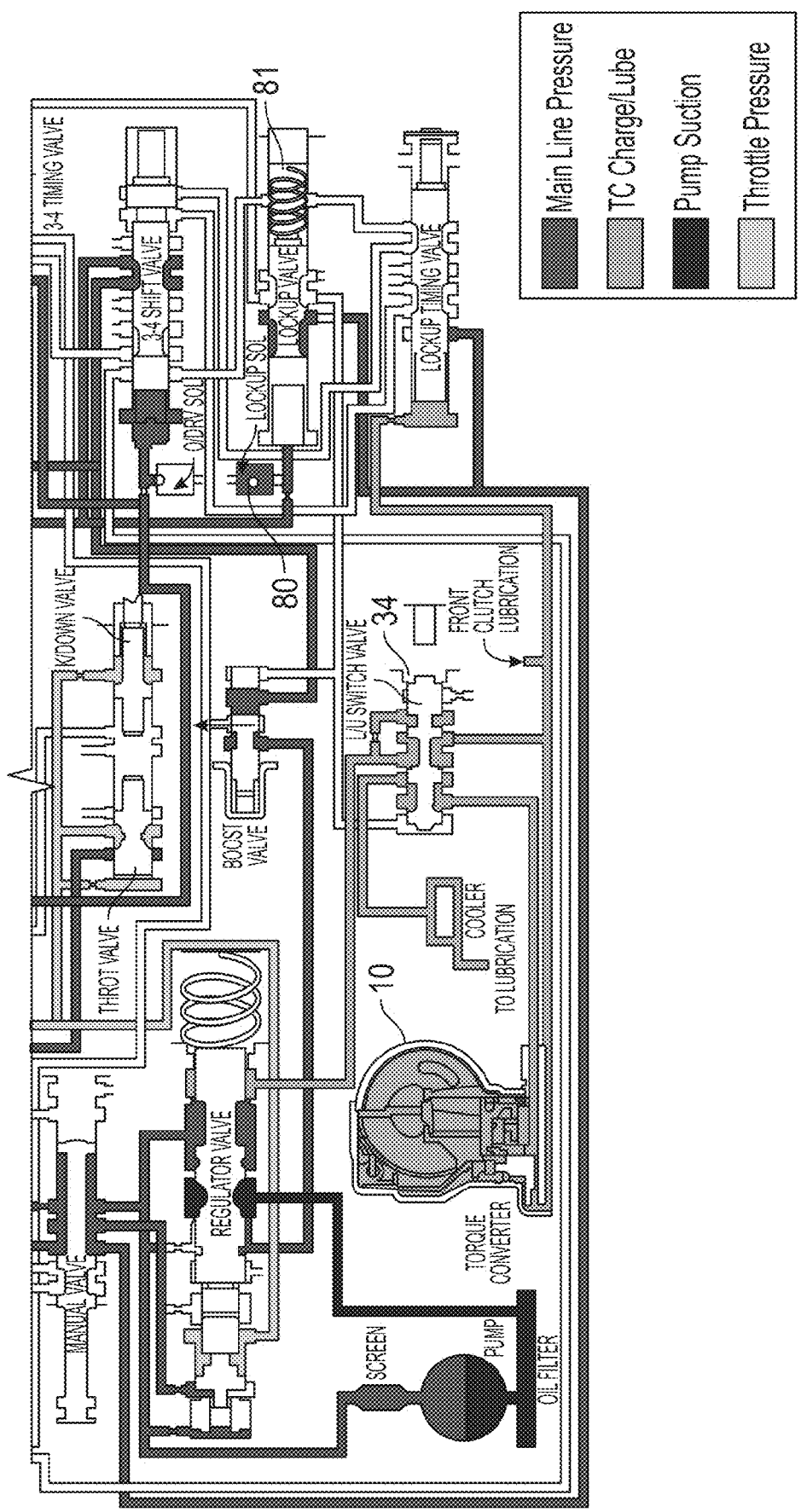
FIG. 7 is a portion of a schematic view showing the hydraulic circuitry of a prior art torque converter when the clutch is unlocked.
Figure 8:
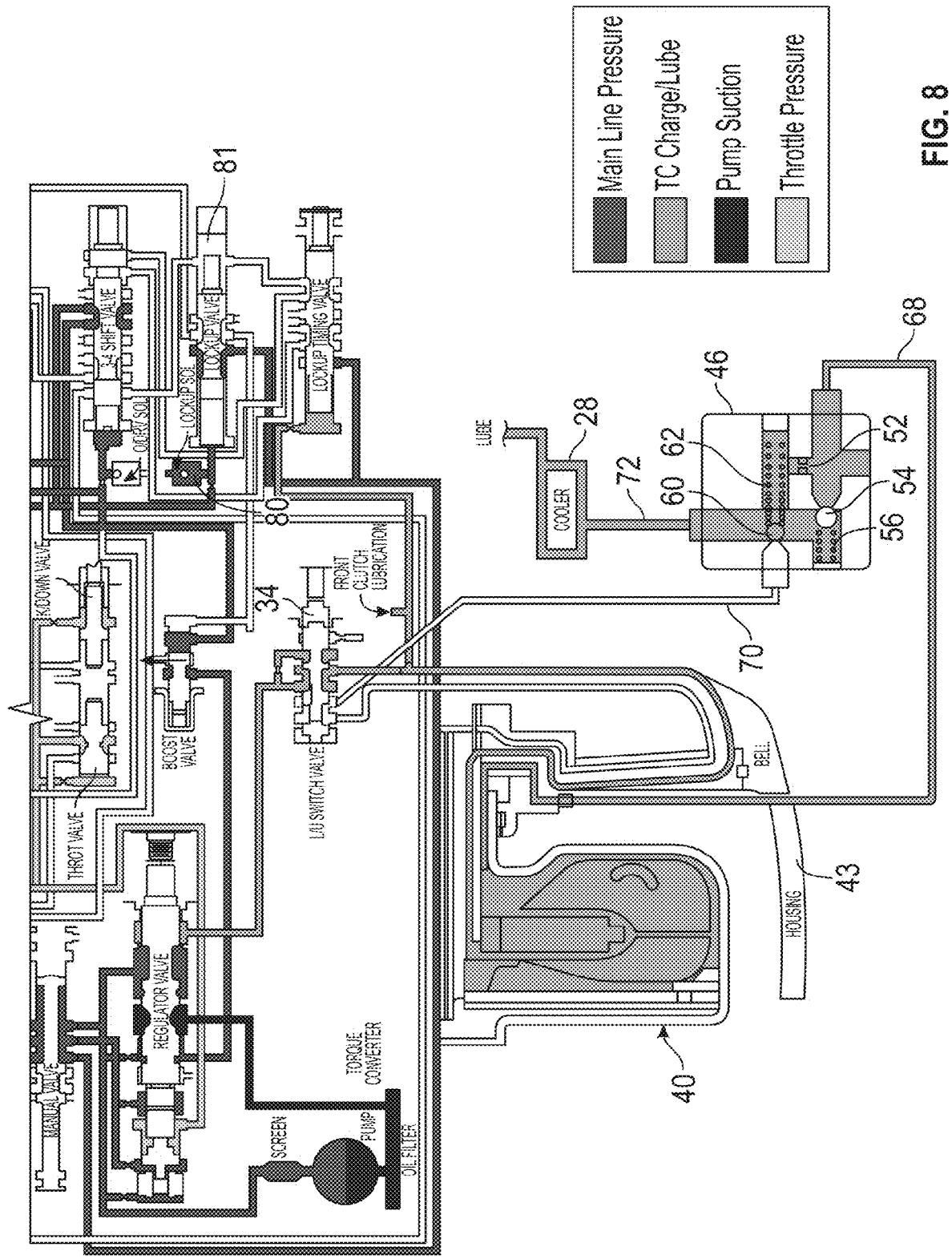
FIG. 8 is a portion of a hydraulic circuit schematic for the captive clutch of the present invention in an unlocked state.
Figure 9:
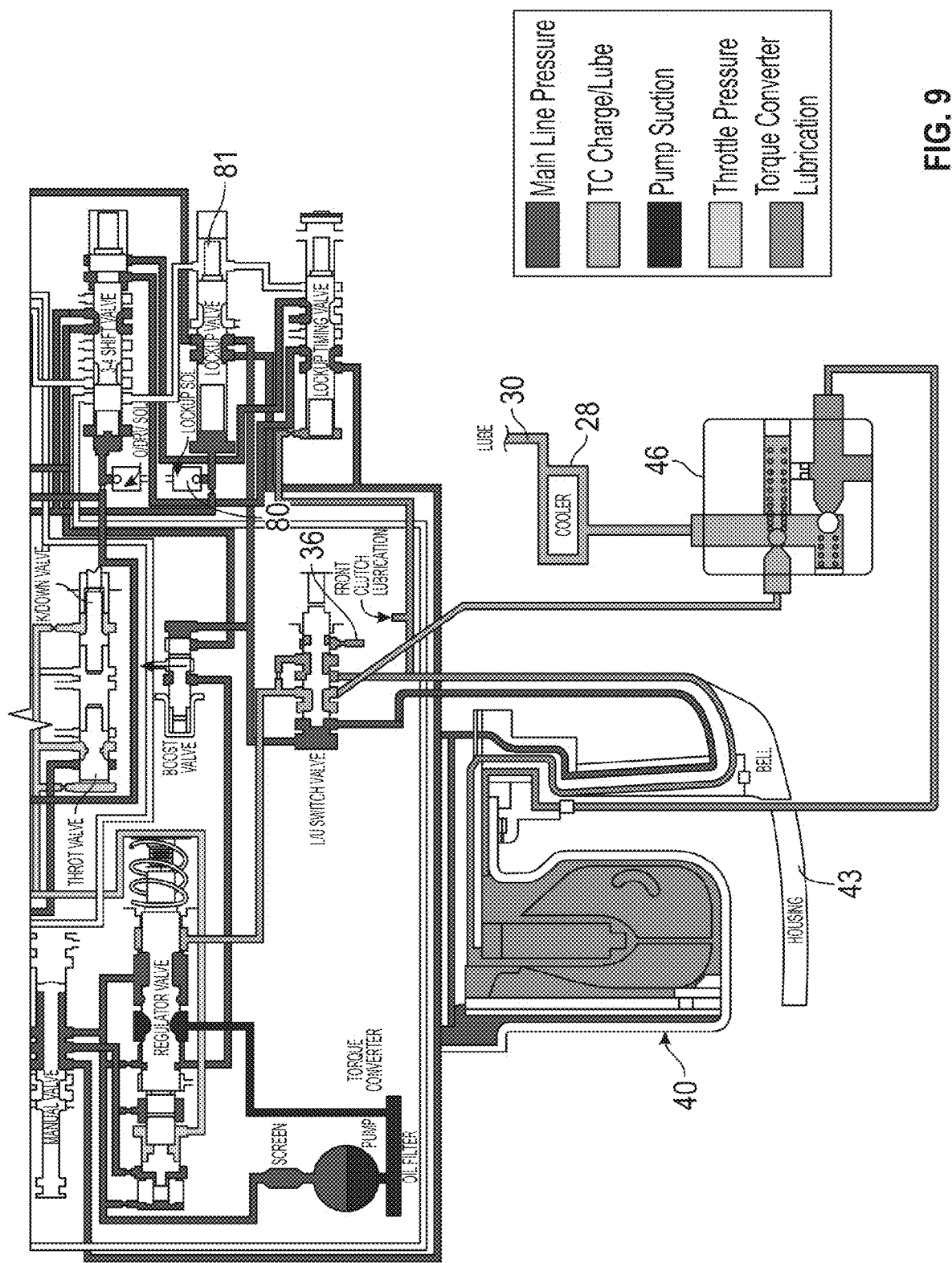
FIG. 9 is a portion of a hydraulic circuit schematic with the captive clutch in a locked state.

FIGS. 4 and 5 show a fluid flow control block 46 used in conjunction with the torque converter 40. The block 46 includes a first oil passage D, a second oil passage E, and a third oil passage F. The passage E intersects with passages D and F. Passages D and F are also connected by a path 48, into which a plug 50 with a small diameter orifice 52 is mounted therein. The orifice 52 allows back charge in the converter 40 during lock up of the clutch 20. A first check ball 54 and a first spring 56 reside in the passage D, and are retained by a removable threaded plug 58. A second check ball 60 and a second spring 62 are mounted in the passage F, and are retained by a removable threaded plug 64.

The passageway C of the torque converter 40 is connected to the inlet 66 of passage D by a hose or line 68, as shown in FIG. 5. The passage F is connected by a hose or line 72 to the front cooler line of the transmission case. The passage E is connected to the cooler 28 by a hose or line 70. The line or hose 68 connecting to passage D of the cooler block 46 extends out of the bell housing 43 of the transmission case through a hole drilled in the housing wall, for connection to the inlet 66 of passage D. The line or hose 72 of passage F comes from the front cooler line of the transmission case. Oil flowing from passage F to the cooler 28 via passage E in the control block 46 through the line or hose 70 then flows to the lubrication circuit at the rear cooler line of the transmission case. Check valves 54, 60 allow only one of the circuits D, F to flow to the cooler 28 at a time. The orifice 52 in the path 48 allows a controlled amount of oil to back-flow into the torque converter 40 while passage F is flowing to the cooler 28.

Figure 14A:
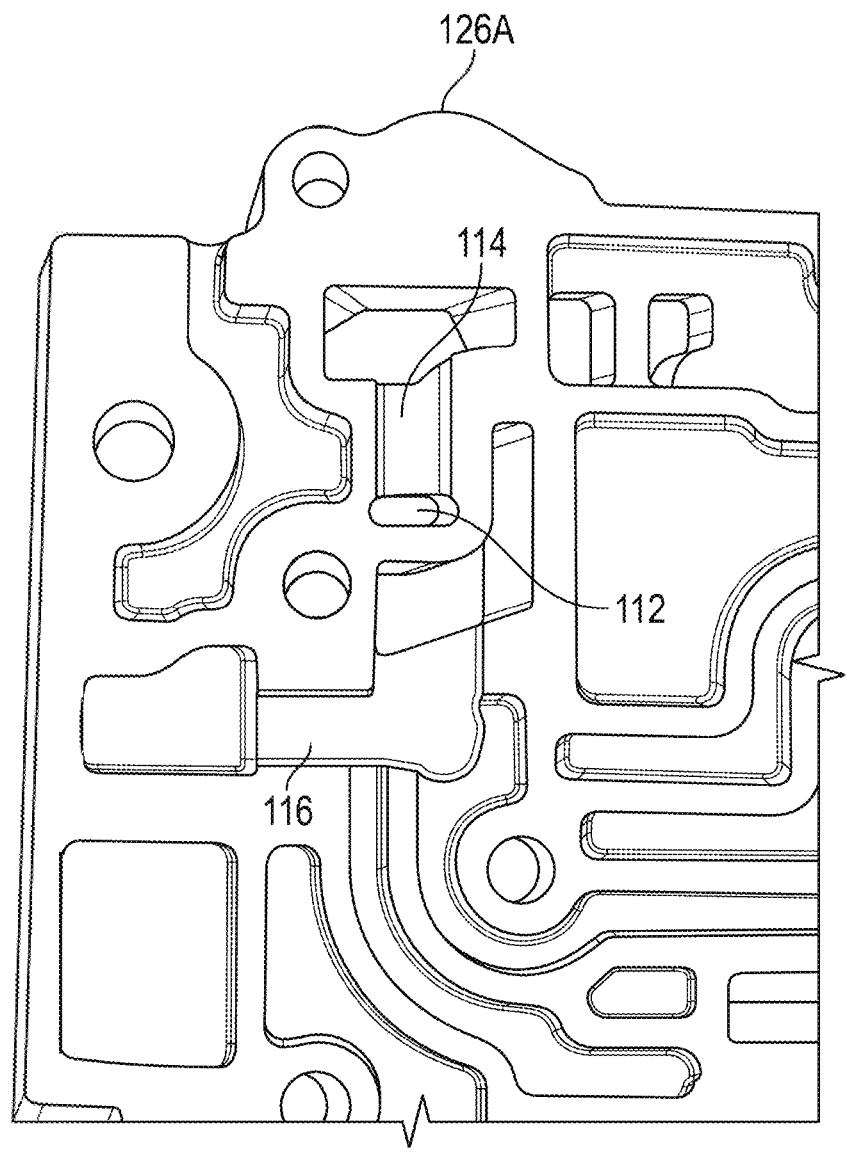
FIG. 14A shows a modified valve body channel casting, according to the present invention, which reverses the torque converter release and apply circuits, without a dump valve.
Figure 16A:
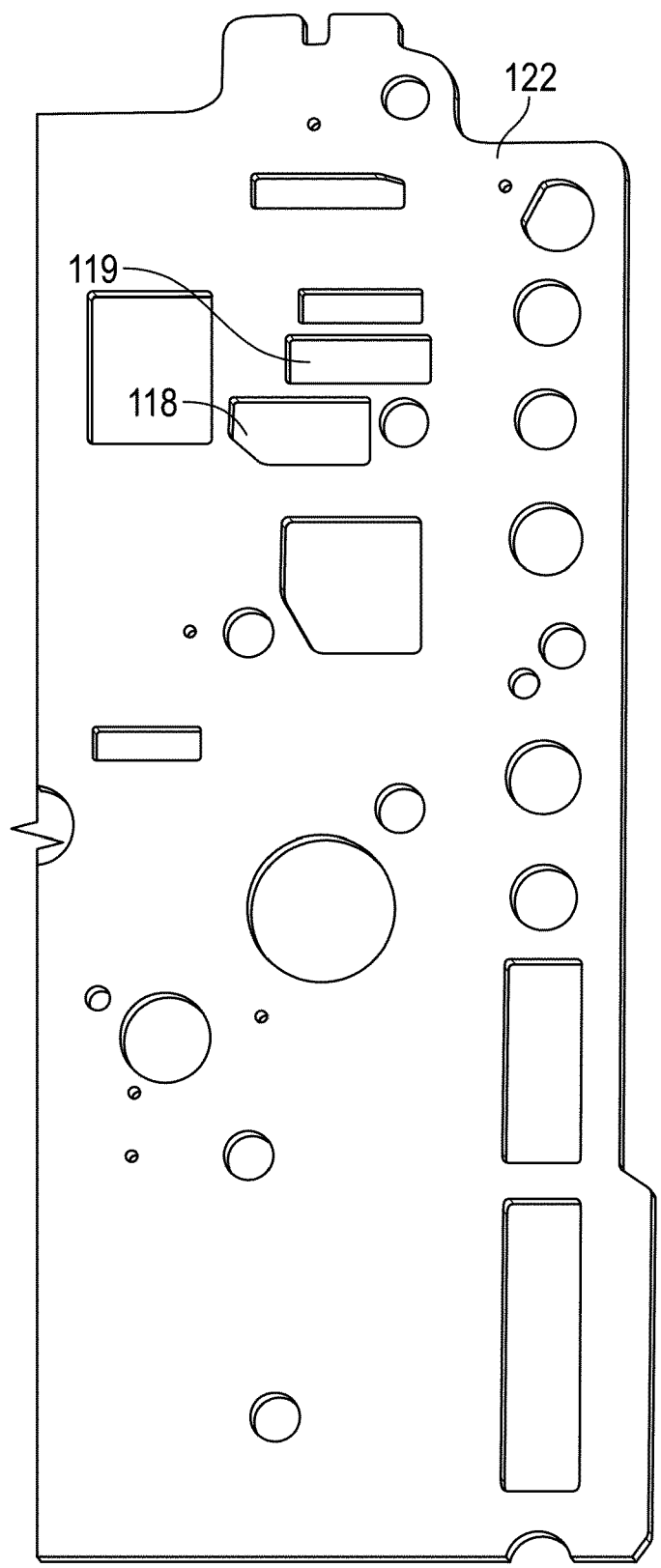
FIG. 16A is a portion of the prior art valve body main separator plate.
Figure 16B:
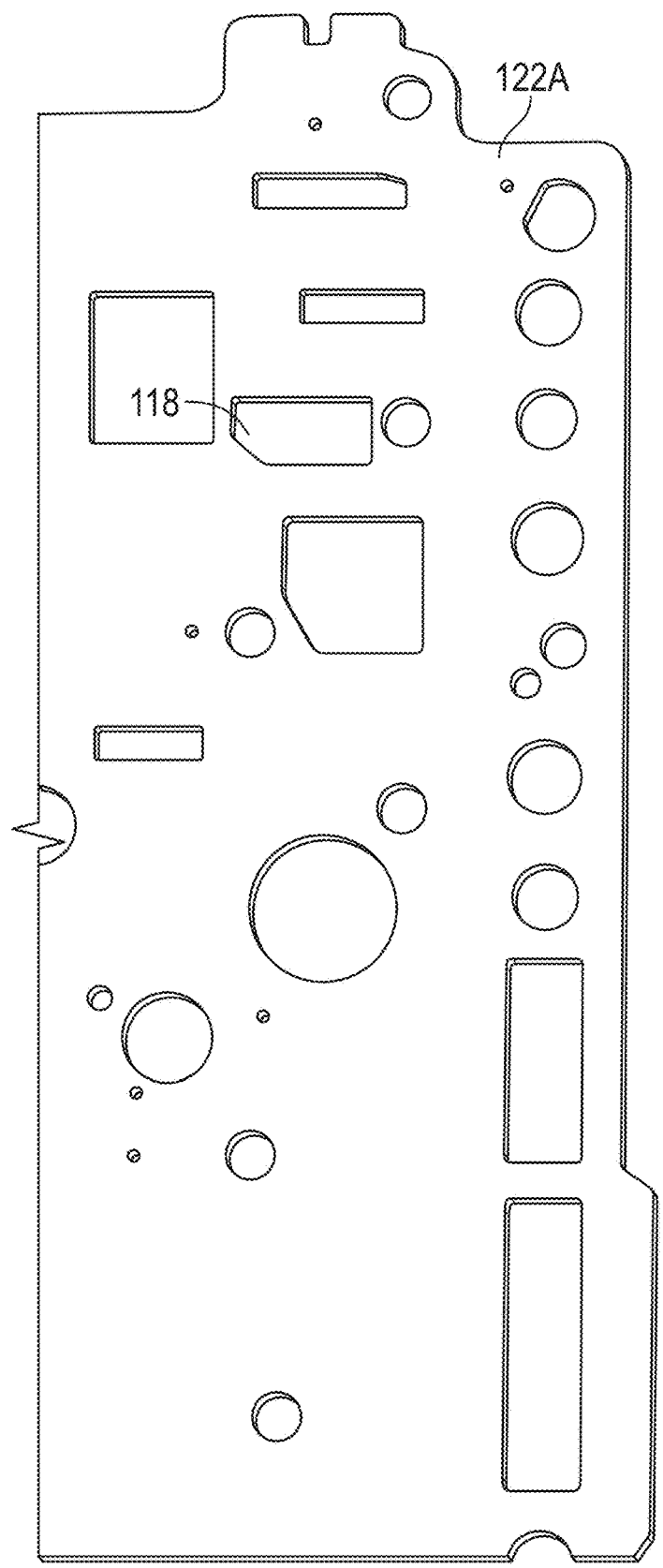
FIG. 16B is a modified valve body main separator plate for a torque converter, without a dump valve according to the present invention wherein a prior art hole is eliminated.
Figure 17A:
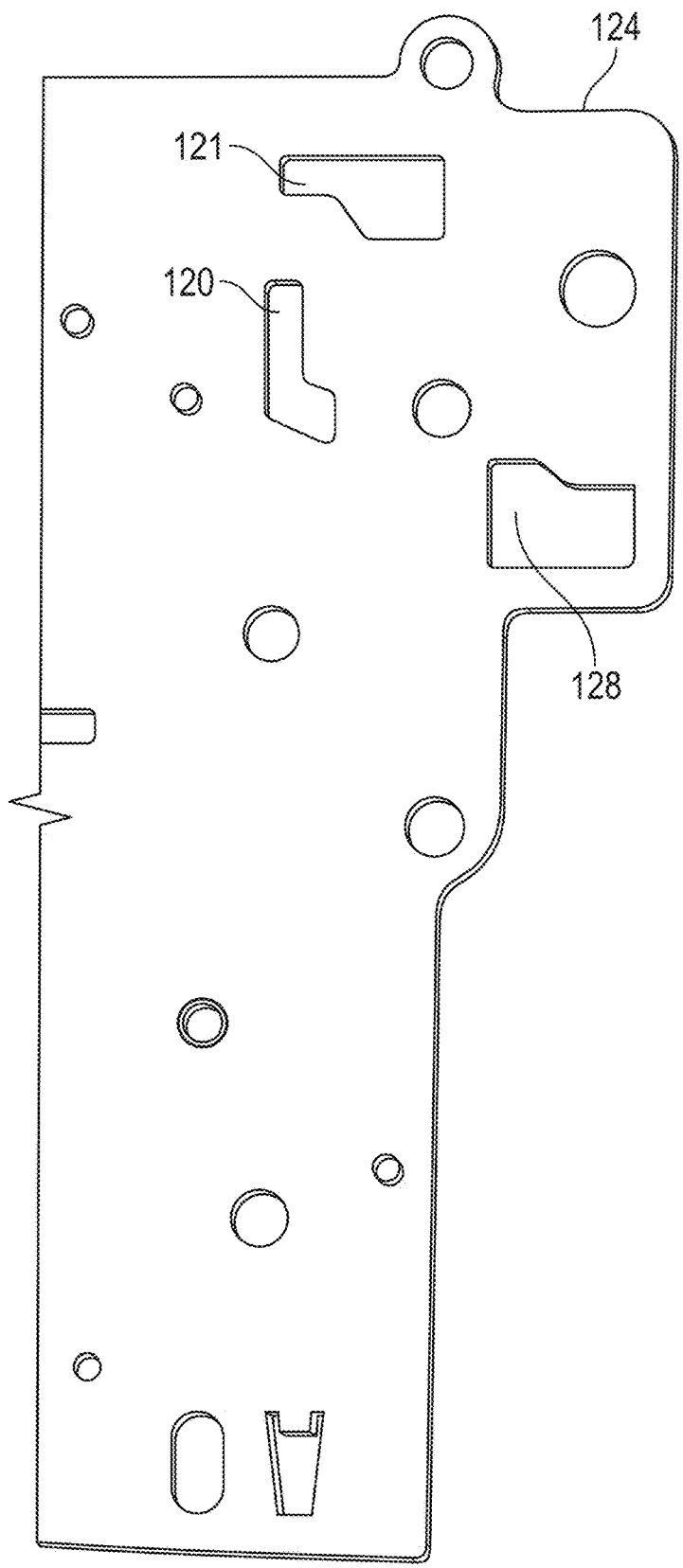
FIG. 17A is a portion of a prior art valve body lower separator plate.
Figure 17B:
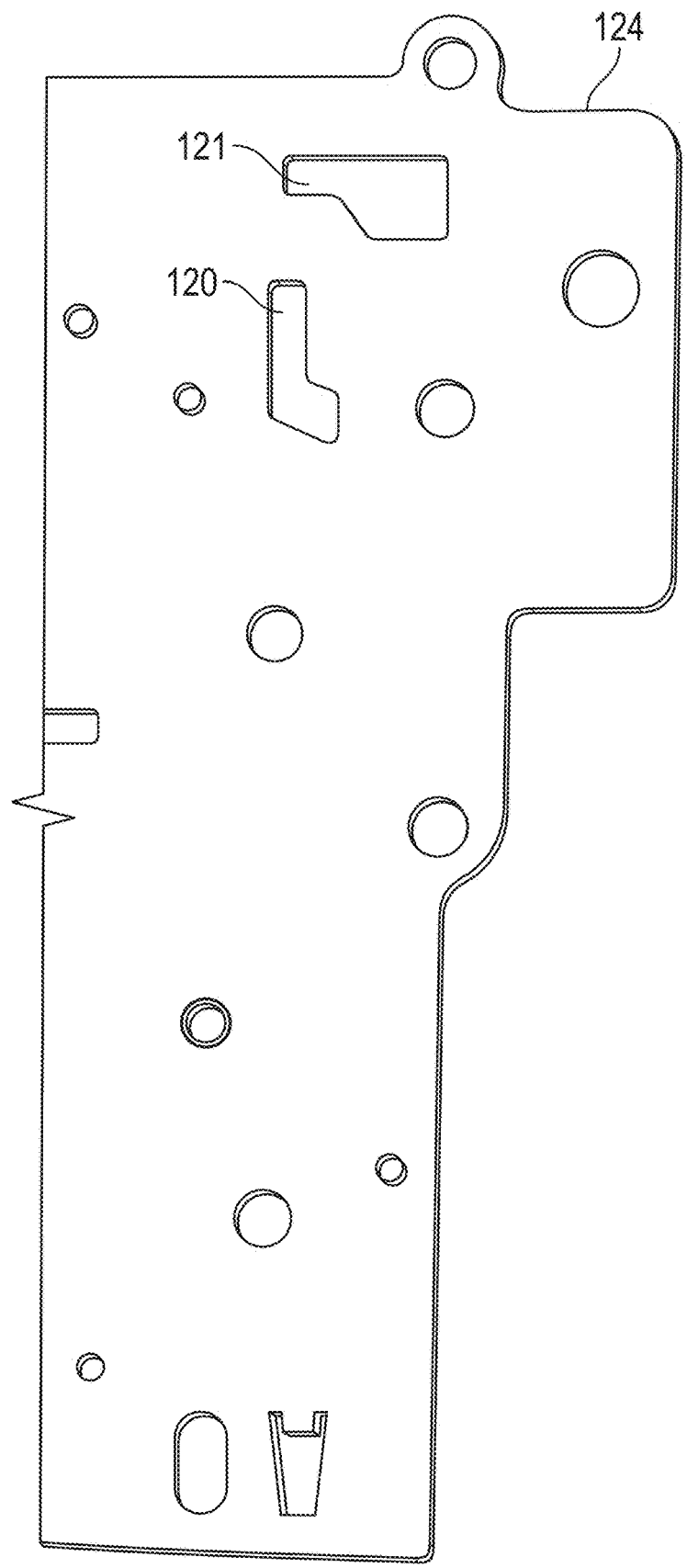
FIG. 17B is a modified valve body lower separator plate according to the present invention wherein the prior art hole is eliminated, without a dump valve.

In the prior art torque converter 10, passage A is the charge pressure or "release" circuit. In the torque converter 40, passage A is the apply circuit. The valve body 32 is modified from a conventional valve body 32 by modifying conventional channel casting 126 by adding a hole 112, milling a first channel 114 into the valve body channel casting 126A to direct charge pressure to passage B, and milling a second channel 116 to direct the clutch apply circuit to passage A. See FIG. 14A. Next a modified valve body main separator plate 122A is made by eliminating hole 119 (FIG. 16B) from the prior art main separator plate 122 (FIG. 16A). Similarly a modified lower separator plate 124A is made (FIG. 17B) by eliminating hole 128 from prior art lower separator plate 124 shown in FIG. 17A. Together, these modifications reverse the TC "release: and "apply" circuits of the transmission.

Figure 14B:
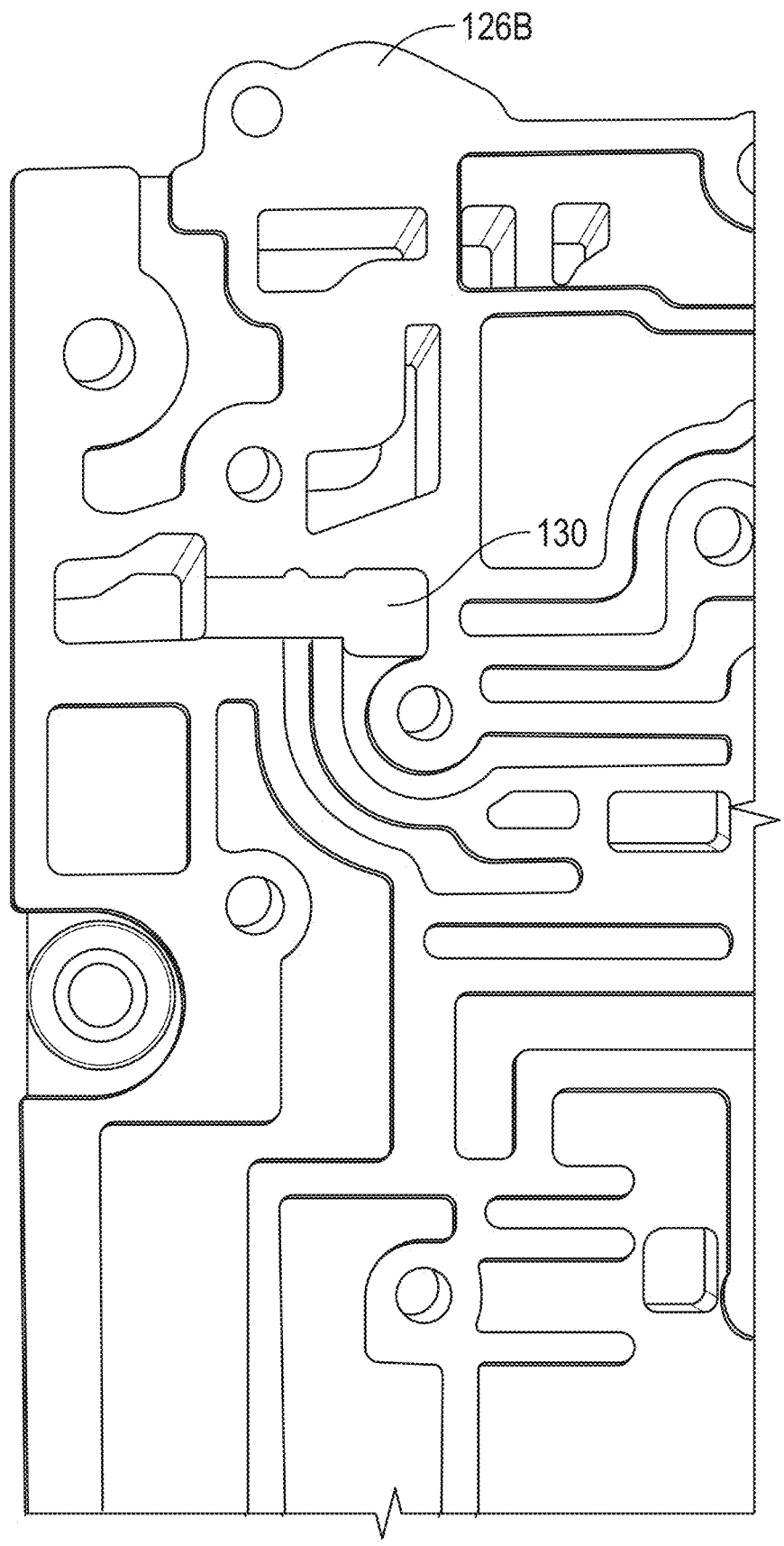
FIG. 14B is a modified valve body channel casting for a torque converter, with a dump valve, an alternate embodiment of the present invention, with a milled channel to direct fluid from the lockup valve to the apply circuit.
Figure 15A:
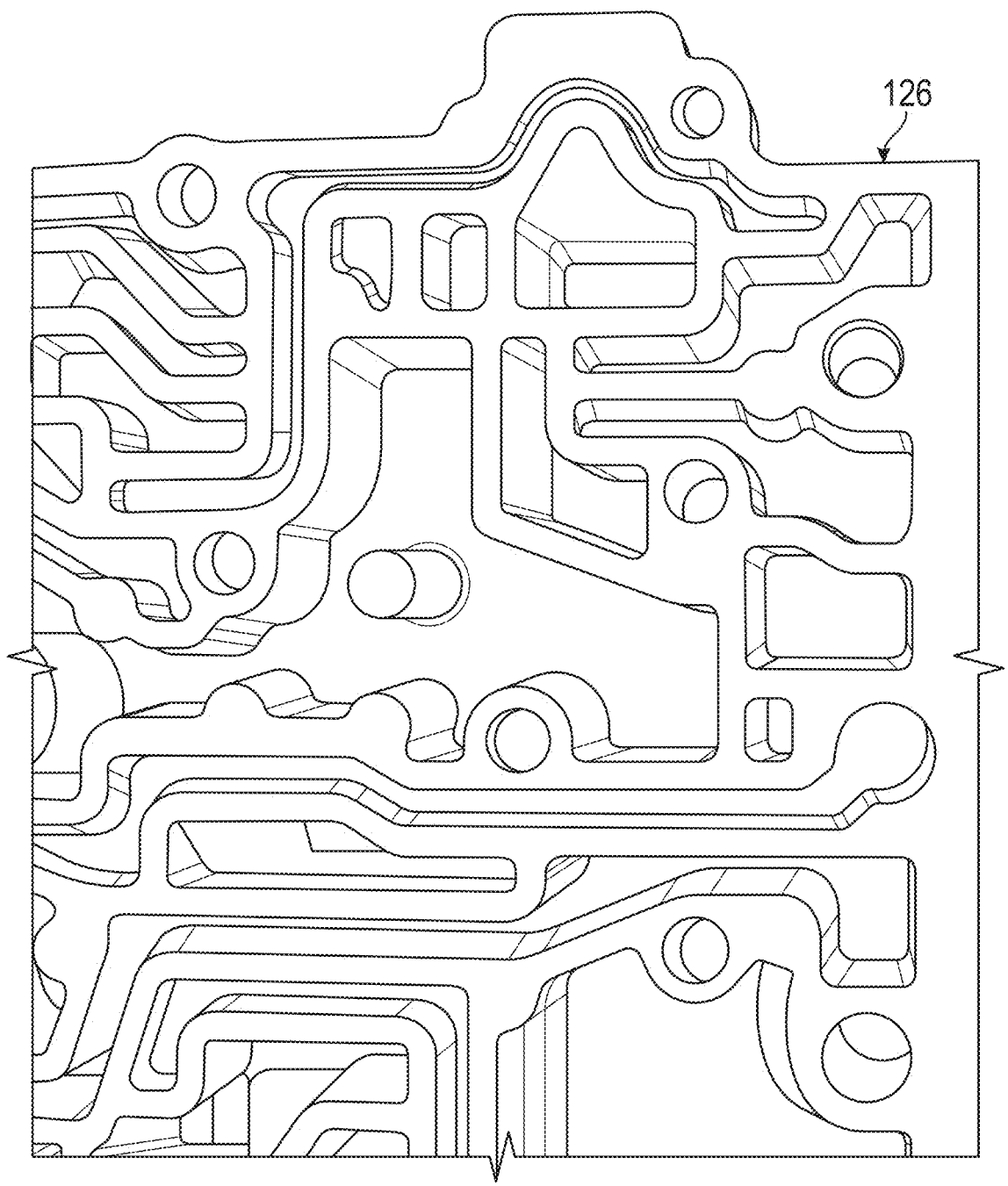
FIG. 15A is a prior art valve body channel casting.
Figure 15B:
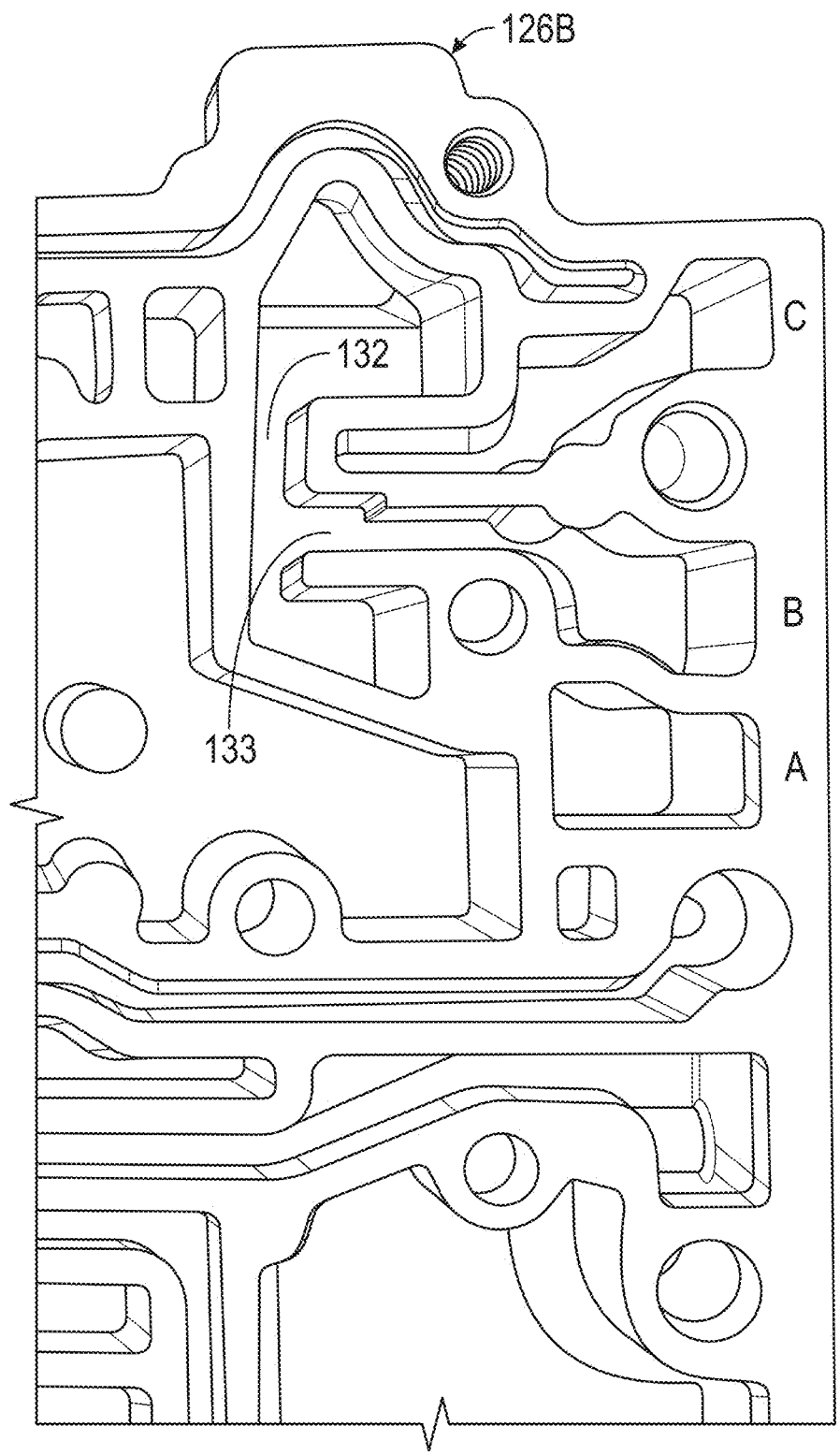
FIG. 15B is a modified valve body channel casting, with a dump valve, an alternate embodiment of the present invention that directs charge pressure to the oil passage B while the torque converter is not locked, and to provide a path for the pressure to exhaust to the sump when the torque converter is locked and/or the dump valve solenoid is energized.
Figure 16C:
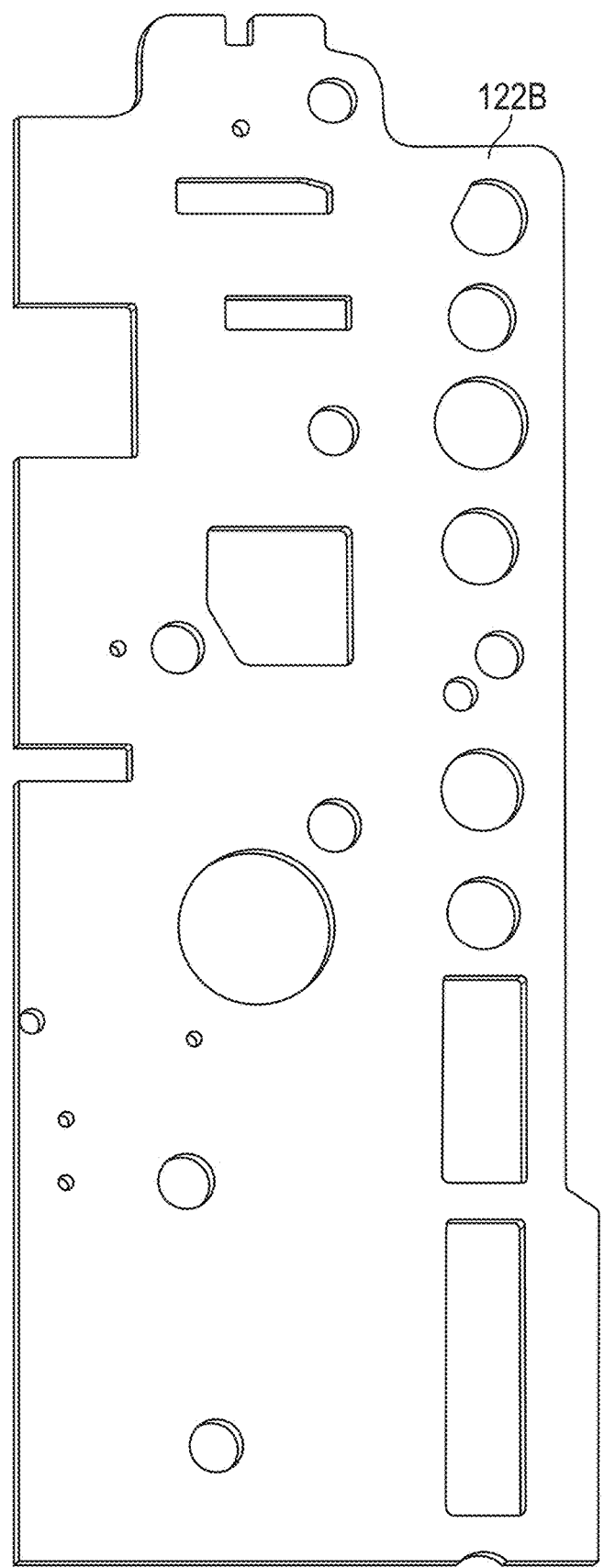
FIG. 16C is a modified valve body main separator plate for a torque converter, with a dump valve, an alternate embodiment of the present invention.
Figure 17C:
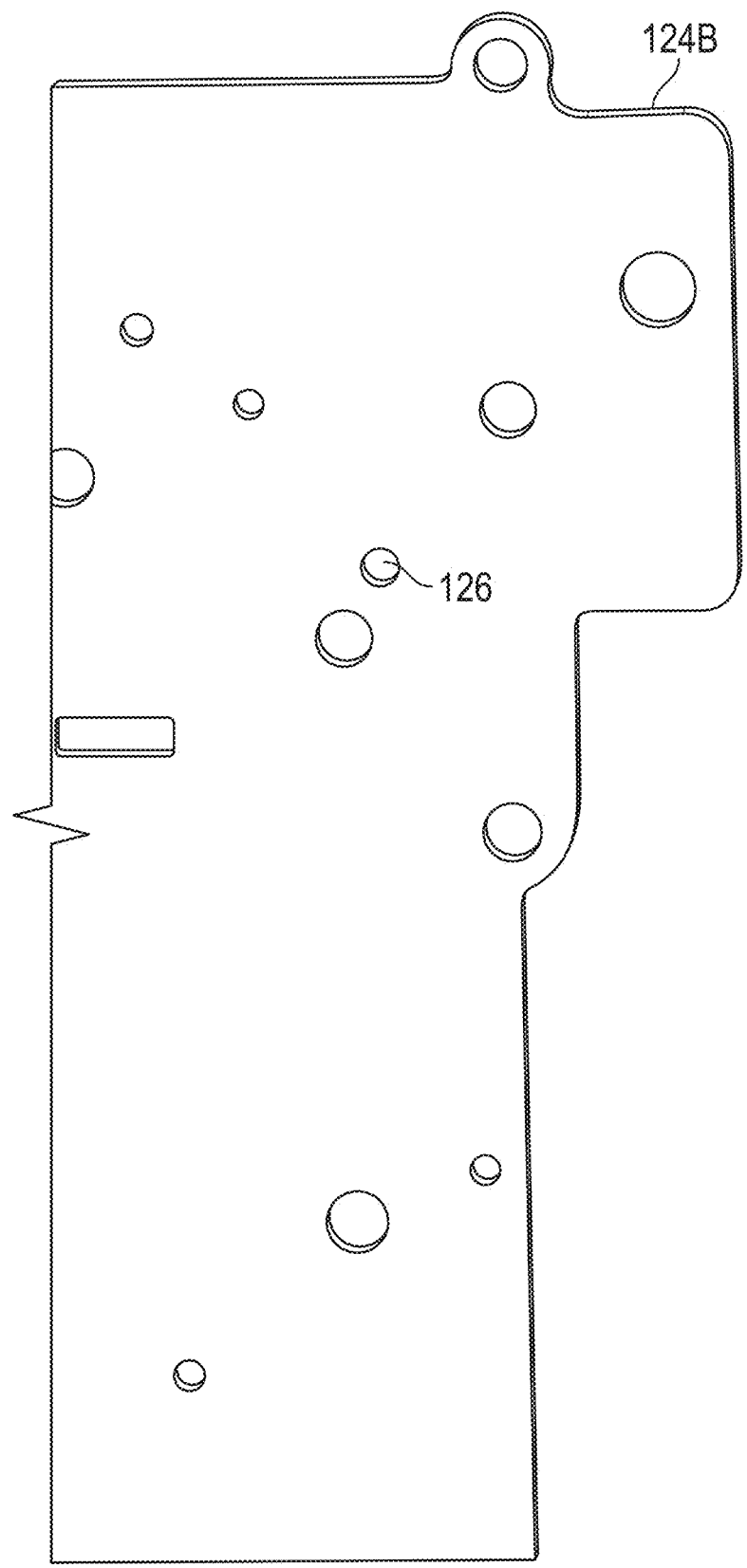
FIG. 17C is a modified valve body lower separator plate of an alternate embodiment of the present invention, wherein the prior art holes are eliminated, and a new lockup feed hole is added, with a dump valve.

In an alternate embodiment of the present invention in which a dump valve system is used, different and additional valve body modifications are made. A modified valve body channel casting is made by milling channel 130 into channel casting 126B, providing a path from lockup valve 81 to clutch apply circuit A (FIG. 14B). Additional modifications are made to the interior of channel casting 126B by milling channels 132 and 133 (FIG. 15B). FIG. 16C shows modified main separator plate 122B with prior art holes 118 and 119 (FIG. 16A) eliminated. Similarly FIG. 17C shows a modified lower separator plate 124B that is made by eliminating prior art holes 120, 121, and 128 shown in FIG. 17A, and the addition of lockup feed hole 126.

Figure 18:
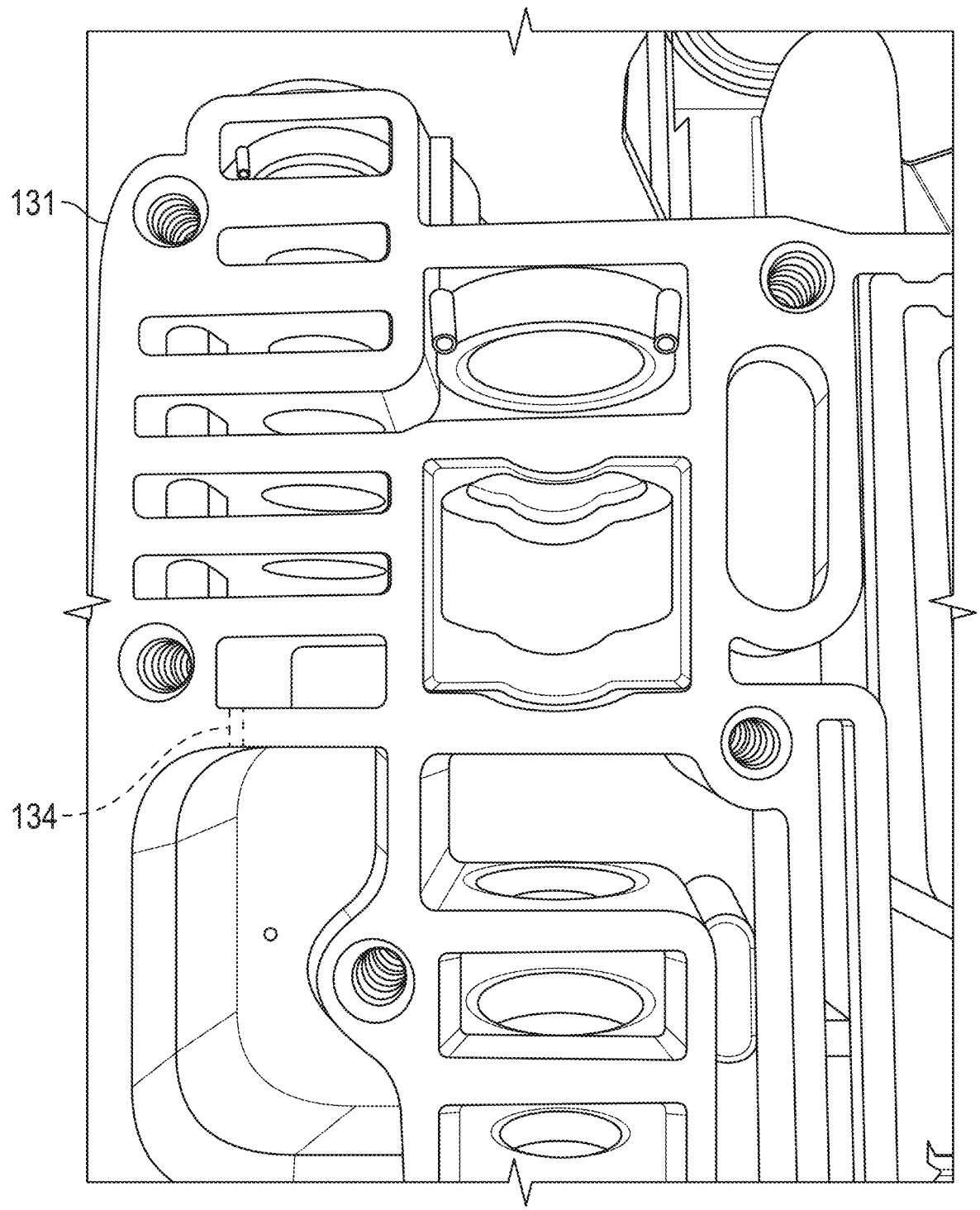
FIG. 18 shows a modified valve body main casting, with a dump valve, an alternate embodiment of the present invention, having an added orifice or a hole to supply line pressure to the dump valve solenoid.
Figure 19:
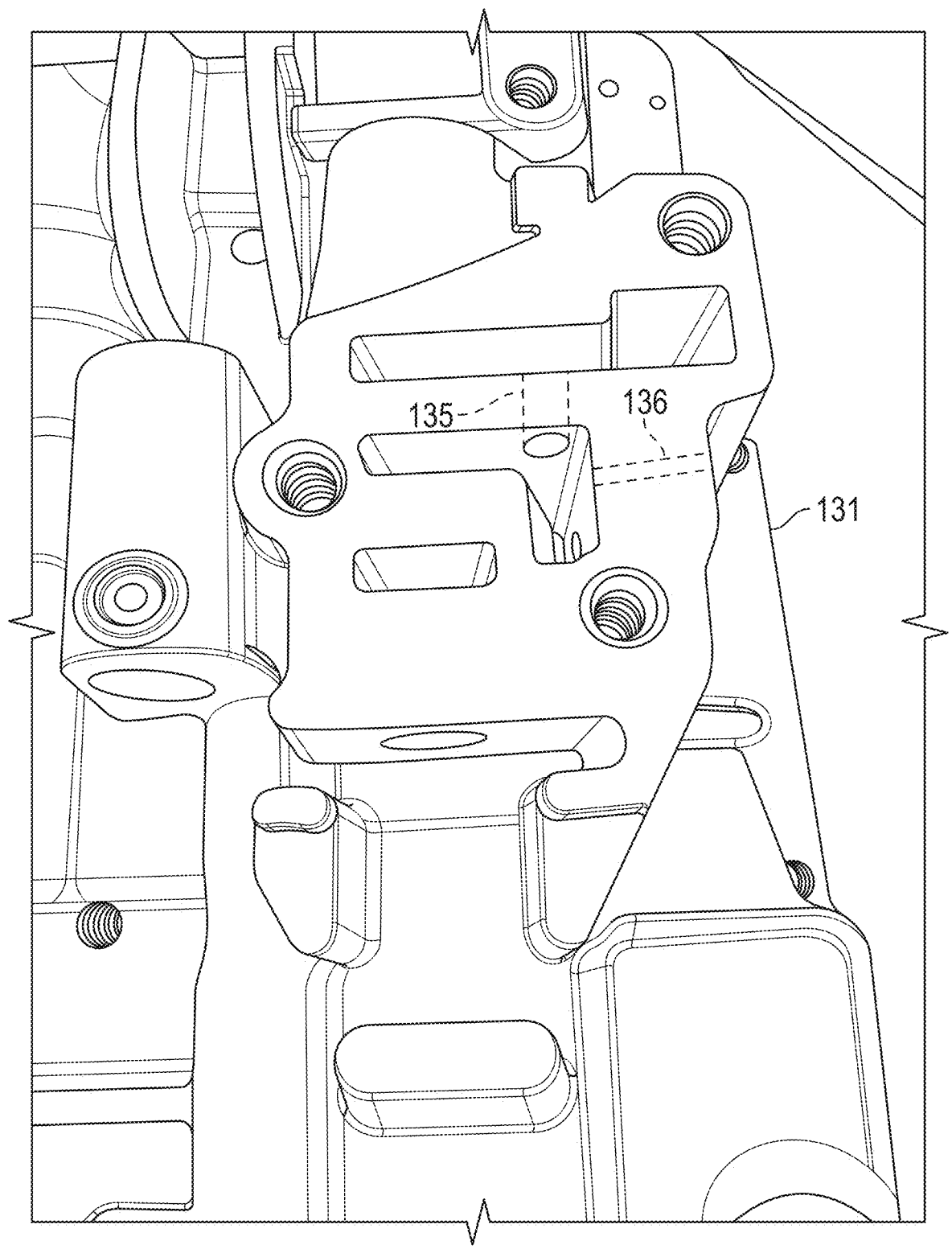
FIG. 19 is a modified valve body main casting, with a dump valve, an alternate embodiment of the present invention, having a hole added to create an oil circuit to the dump valve solenoid.
Figure 20A:
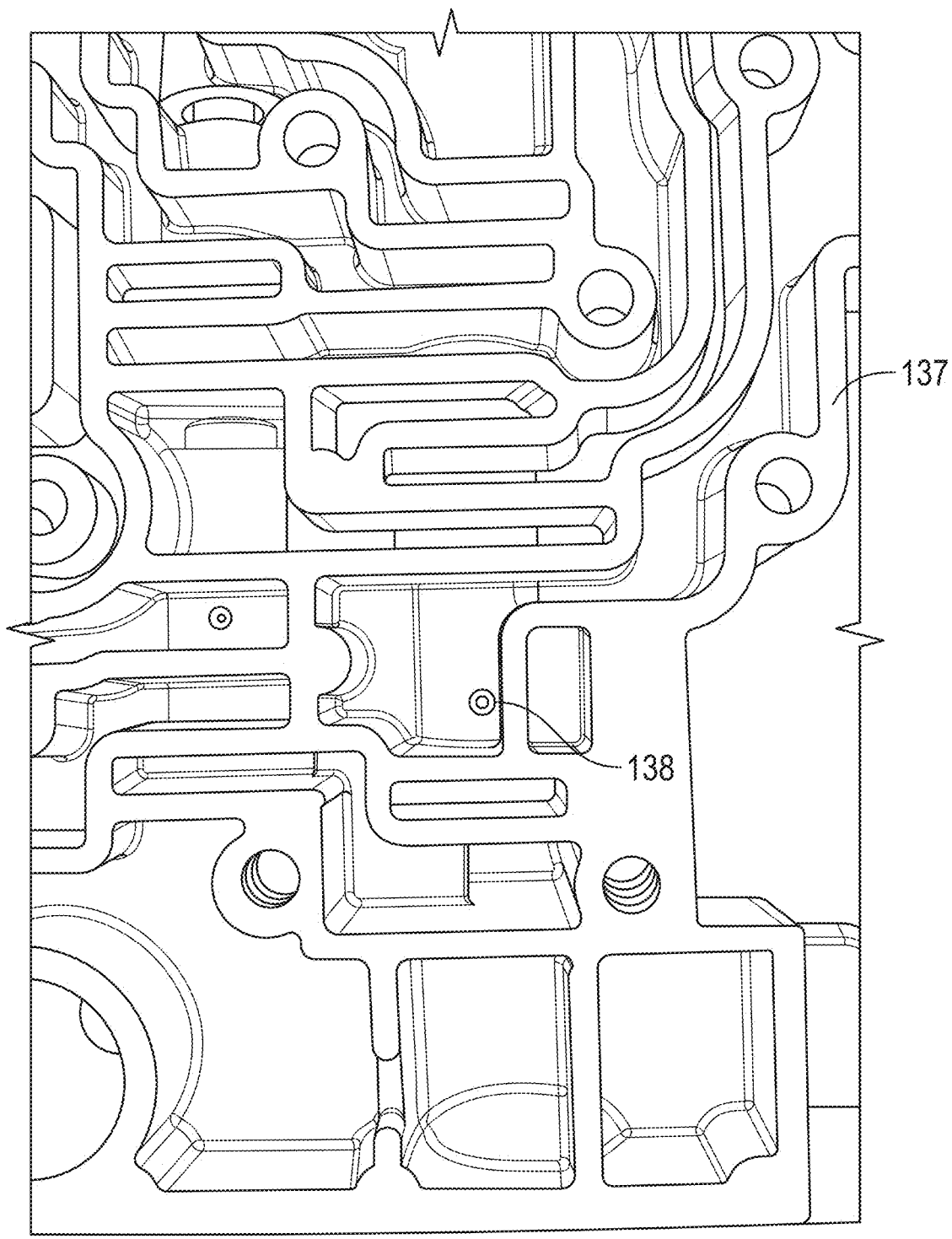
FIG. 20A is a portion of a prior art valve body lower casting.
Figure 20B:
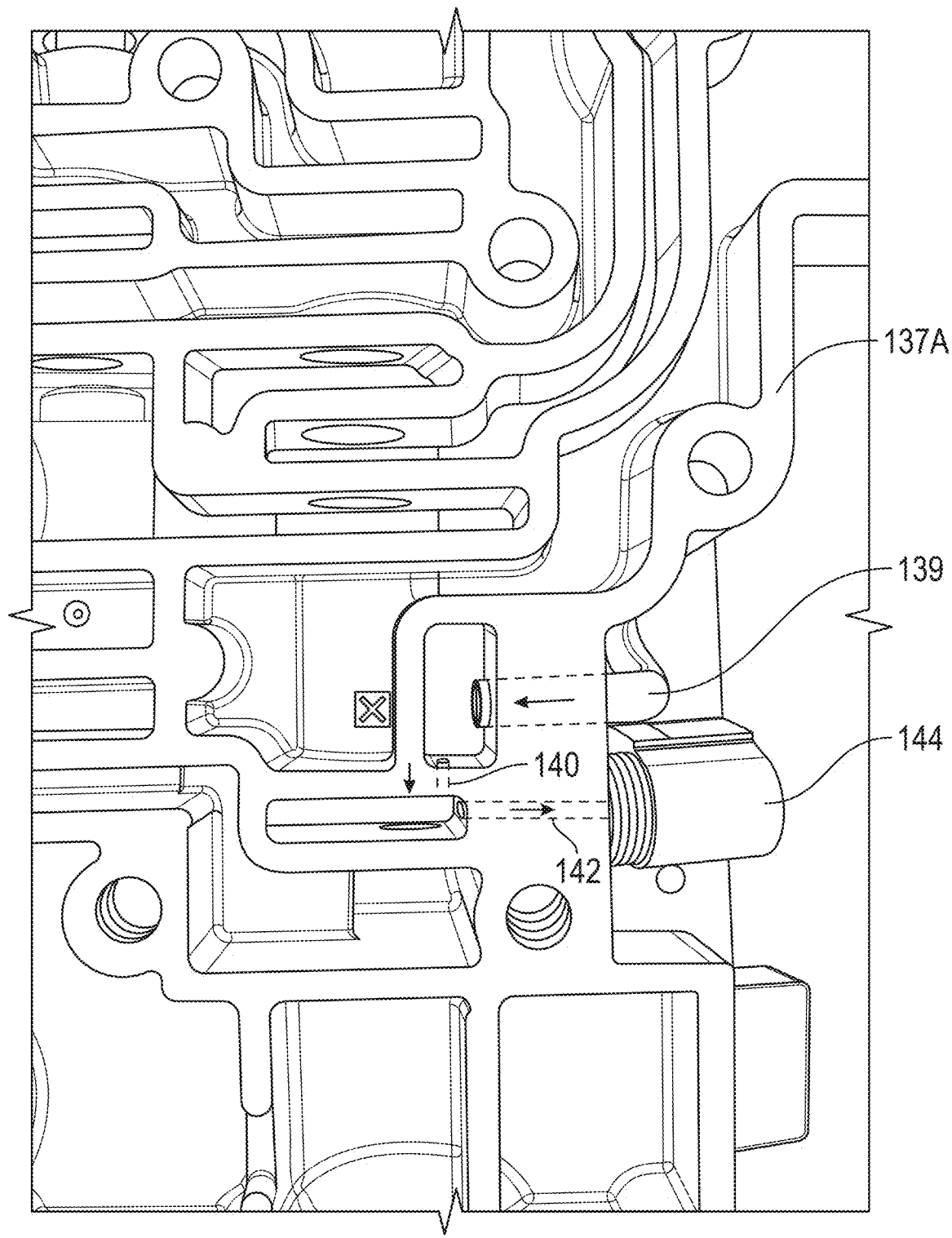
FIG. 20B is a modified valve body lower casting, with a dump valve, an alternate embodiment of the present invention, having the prior art hole blocked, and having holes added for an oil circuit to the dump valve solenoid, and having a pipe fitting attached.
Figure 21A:
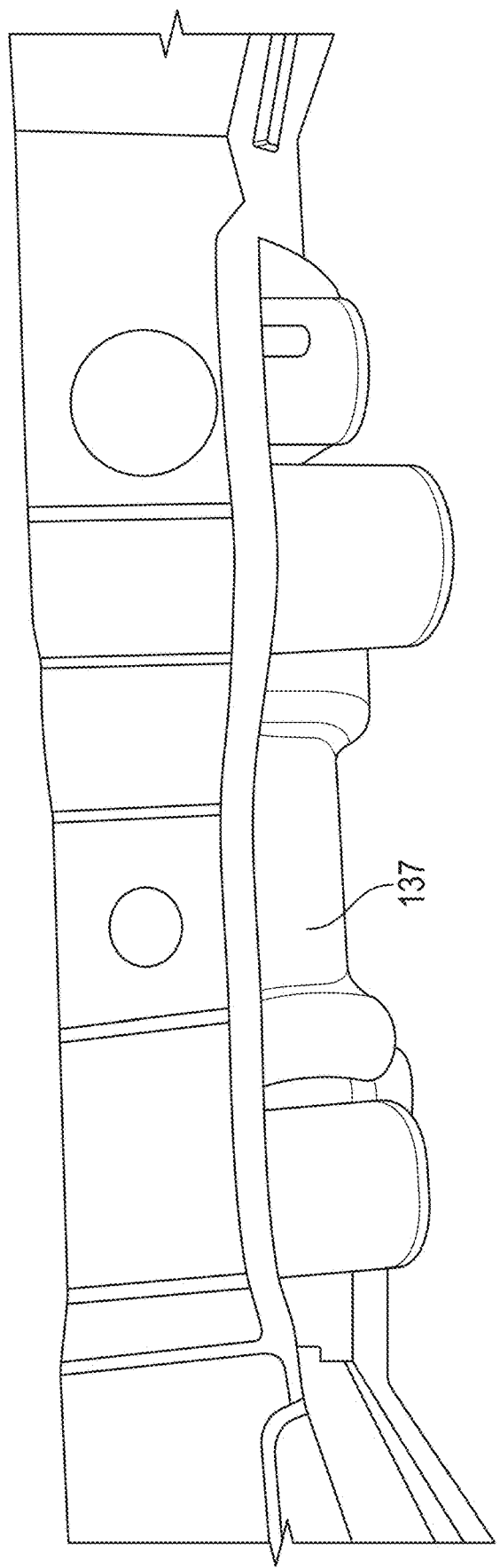
FIG. 21A is a portion of a prior art valve body lower casting.
Figure 21B:
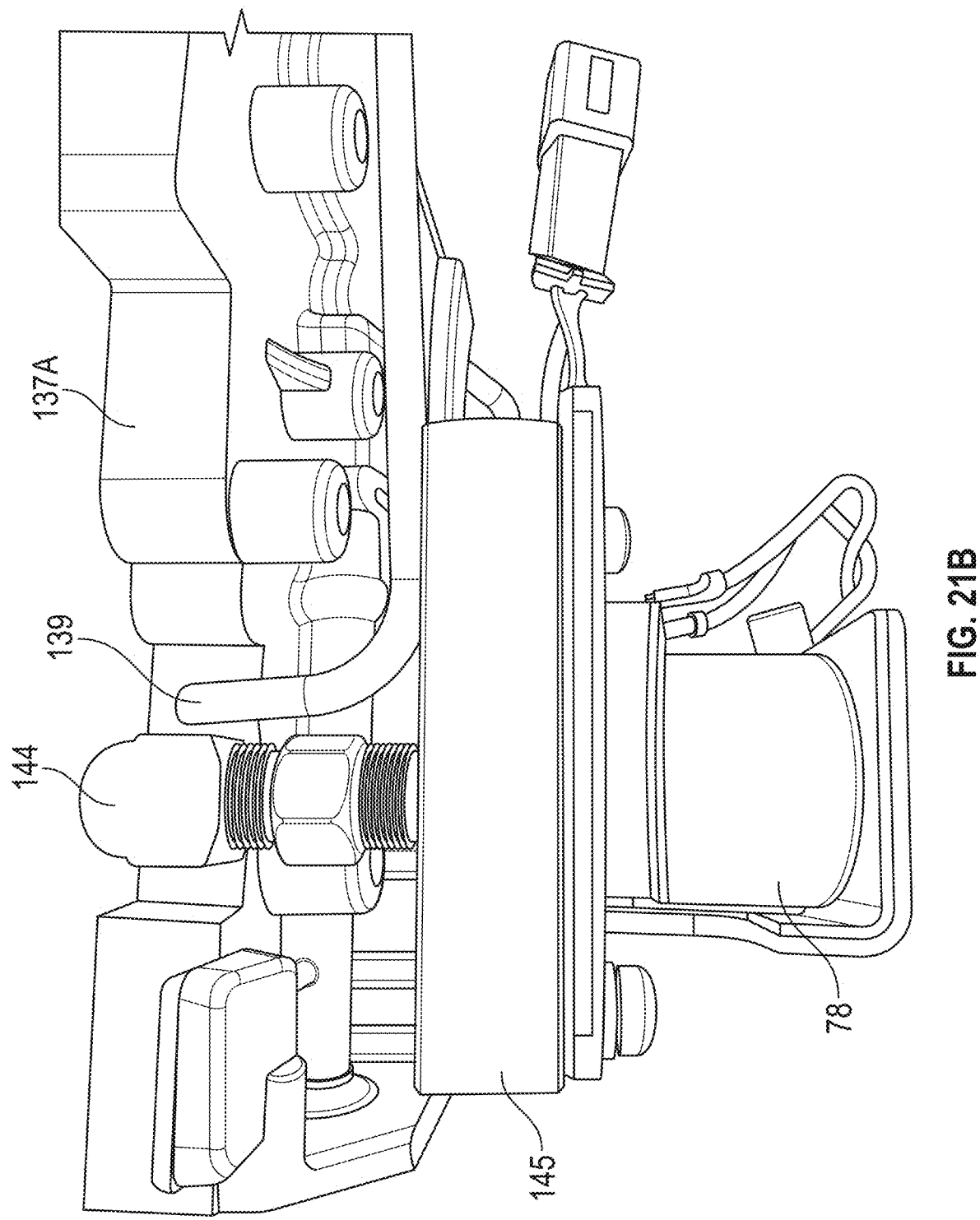
FIG. 21B is a modified valve body lower casting, with a dump valve, an alternative embodiment of the present invention which creates an oil circuit to the dump valve solenoid.
Figure 22A:
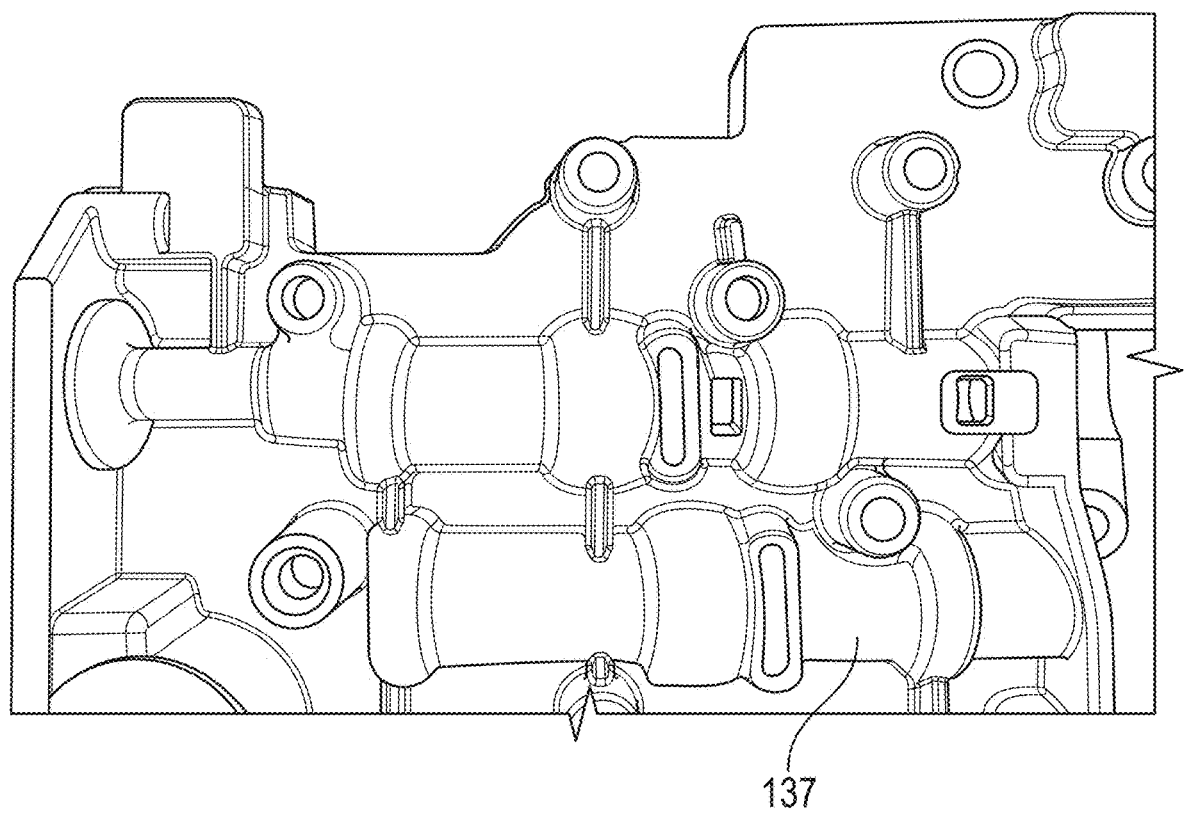
FIG. 22A is a portion of a prior art valve body lower casting.
Figure 22B:
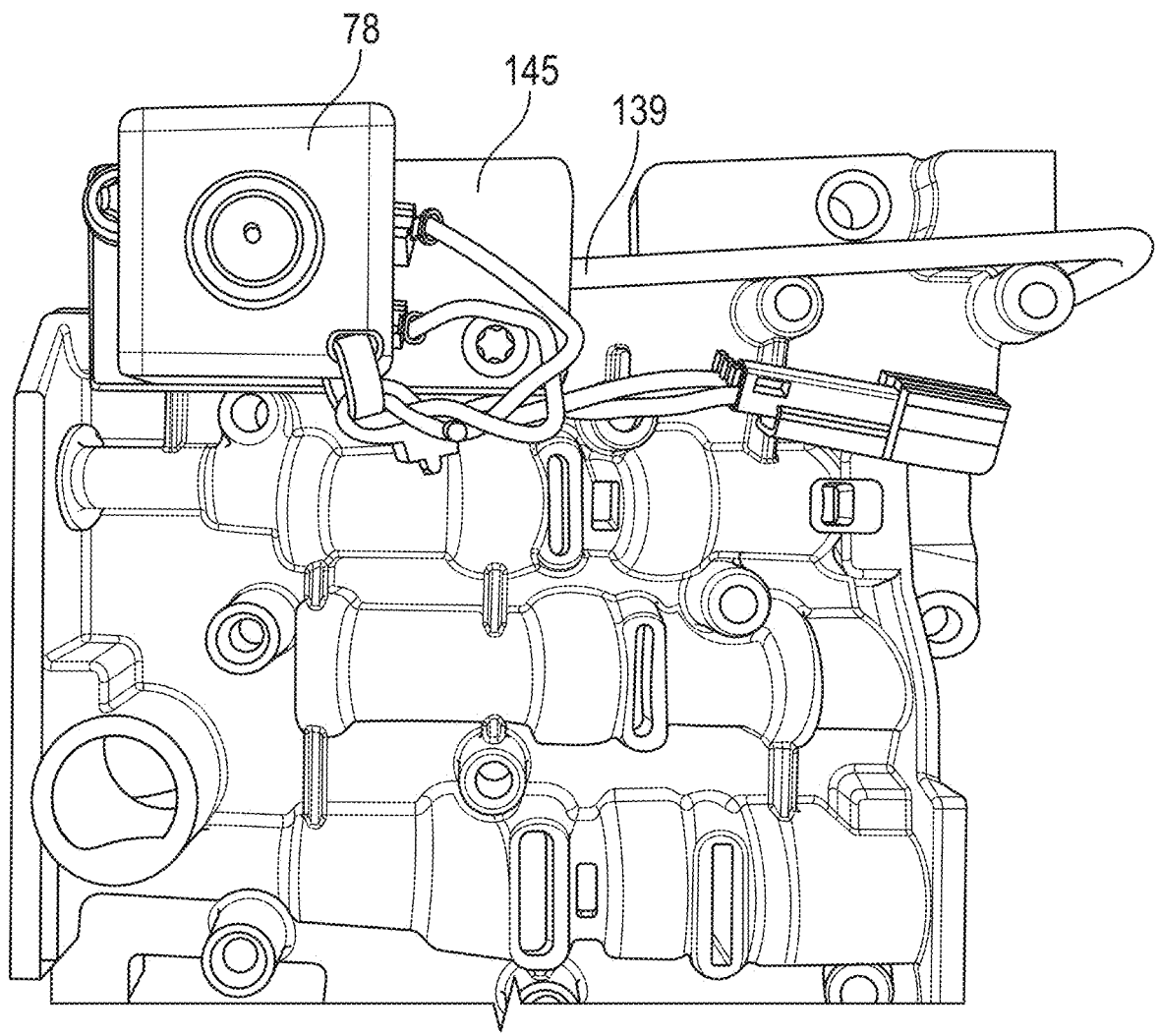
FIG. 22B is a modified valve body lower casting with a dump valve, an alternate embodiment of the current invention with a dump valve solenoid mounted thereon.

FIG. 18 shows the new passage 134 in the modified main casting 131. FIG. 19 shows the modified casting 131 with new hole 135 and prior art hole 136. Prior art "boost tube" 139 connects to hole 136 in the main casting 131 on one end and connects to lower casting 137A (FIG. 20B) when the valve body is fully assembled. Prior art boost tube 139 is repurposed to provide an oil path for dump valve solenoid 78. The prior art valve body lower casting 137 also has a hole 138 (FIG. 20A) which is eliminated in the modified casting 137A, which also has new passages 140, 142 formed therein (FIG. 20B) to create an oil circuit to the dump valve solenoid 78. A pipe fitting 144 is threaded into the casting 137A in line with the hole 142 for outflow of oil to the dump valve solenoid 78 (FIG. 21B).

Figure 23:
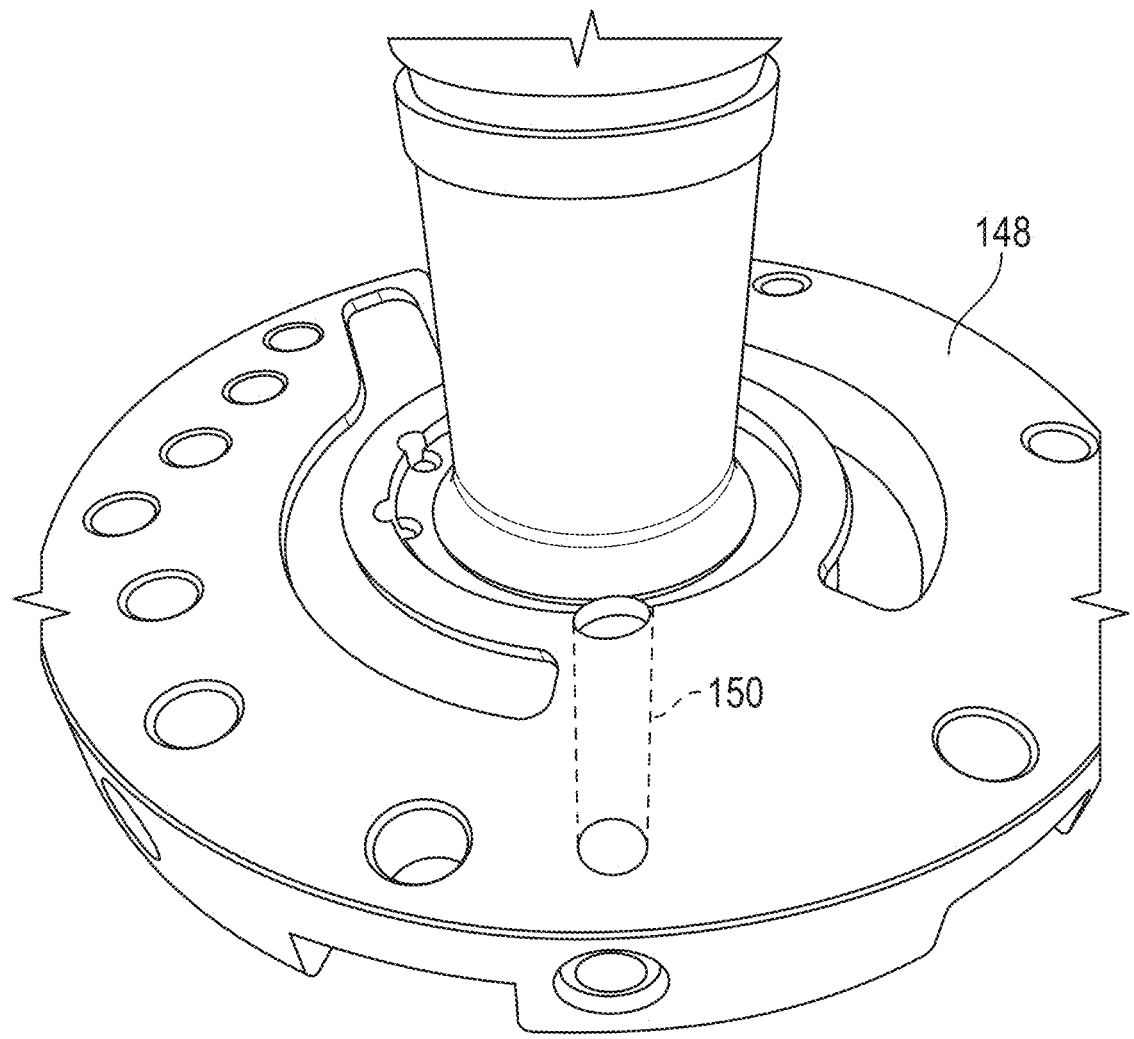
FIG. 23 is a modified pump stator support assembly according to the present invention, with an oil passage added for communication with passageway C.
Figure 24:
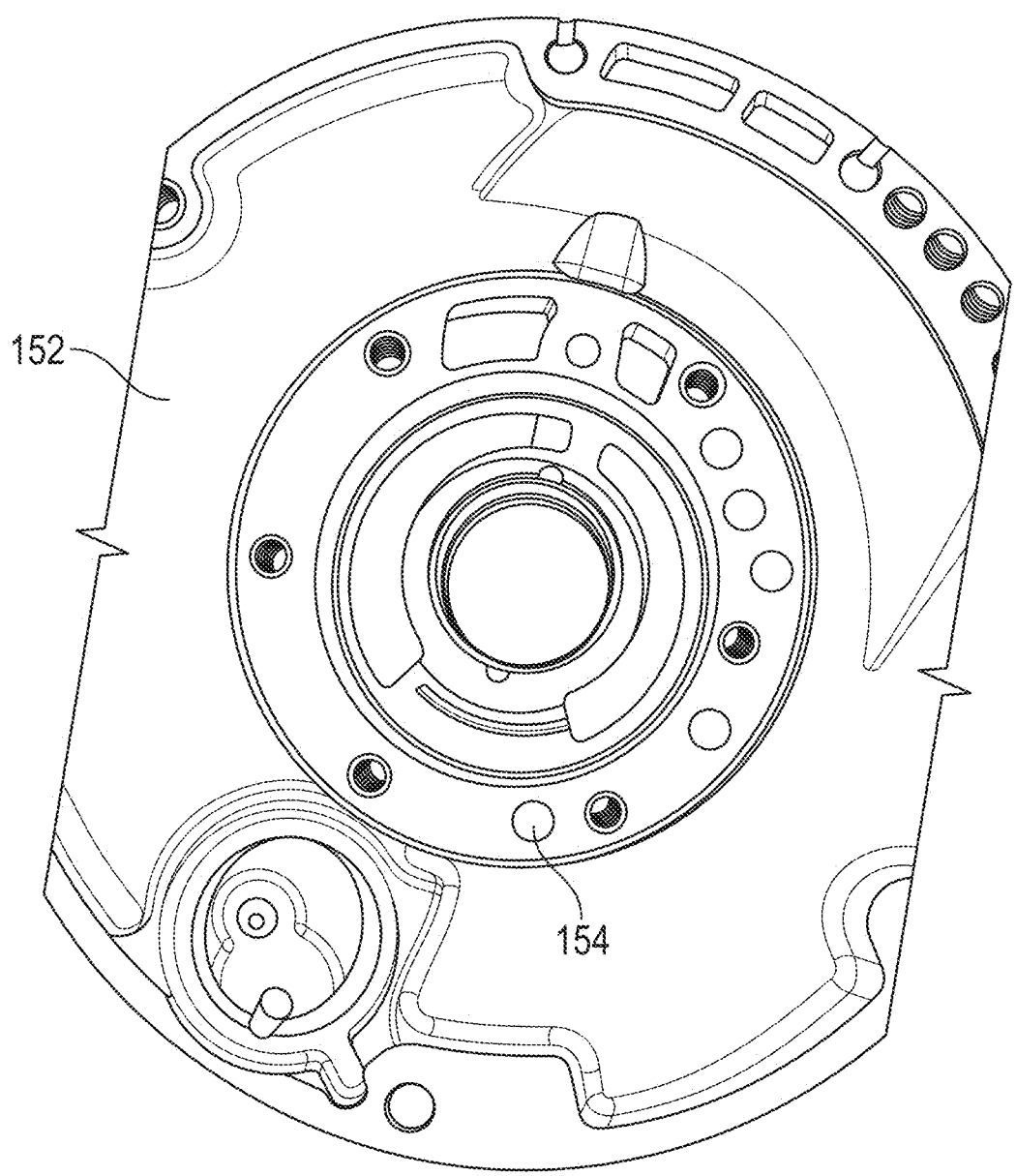
FIG. 24 is a modified pump body according to the present invention, with an additional hole formed for the oil passage C.
Figure 25:
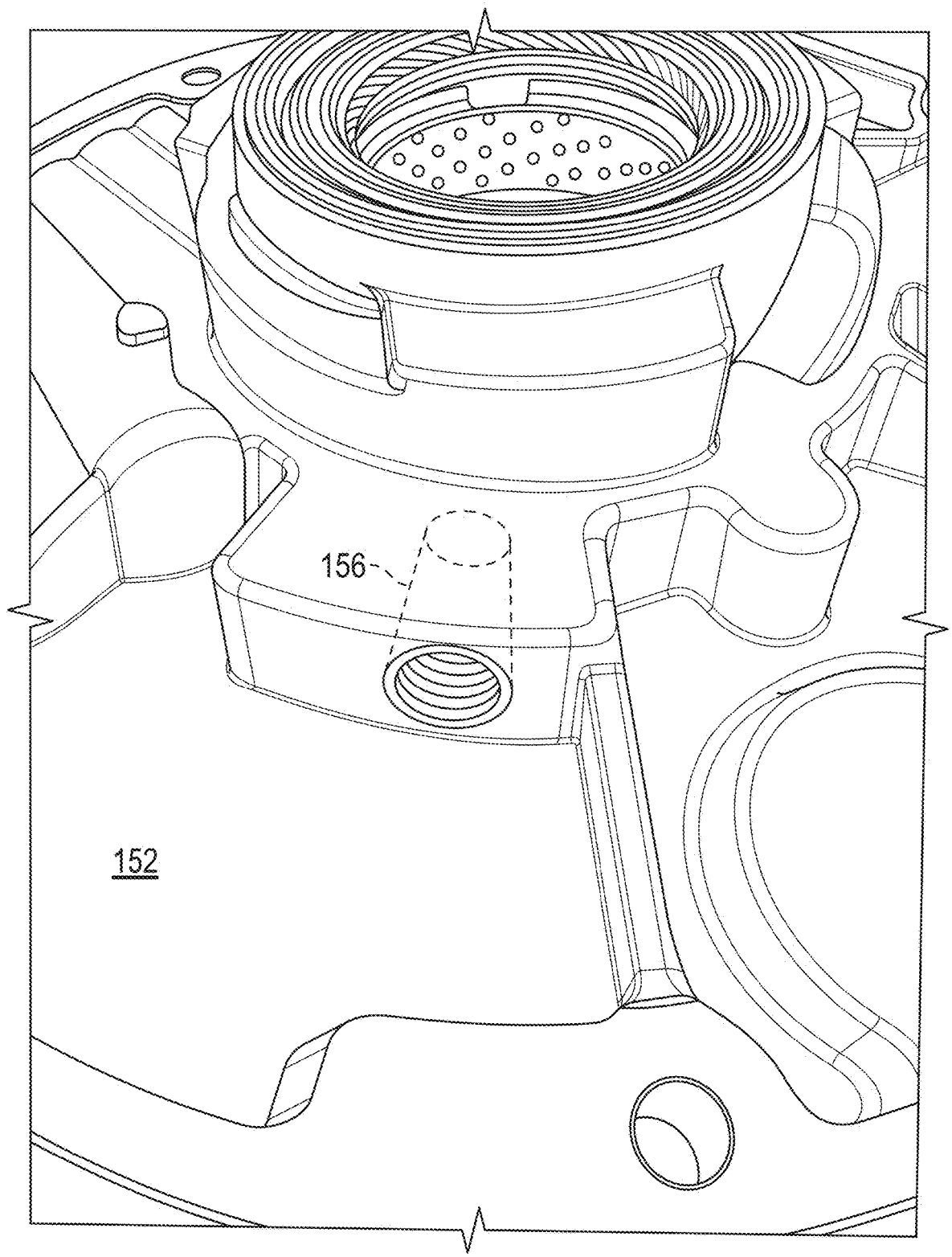
FIG. 25 is a modified pump body with a passageway formed for the oil passage C.

FIG. 23 shows the pump stator support assembly 148, modified to have a passageway 150 for the oil passage C. FIG. 24 shows the pump body 152, with a new hole 154 for the oil passage C. FIG. 25 is another view of the modified pump body 152 and new hole 156. Hole 156 is internally connected to hole 154. When the oil pump is in an assembled state, hole 150 of stator support 148 connects to hole 154 of pump body 152.

When the clutch 20 of the torque converter 40 is unlocked, or released, and engine power is being transmitted to the transmission through the fluid coupling of the torque converter impeller/pump 12 and the turbine 14, with oil passage B being filled with charge pressure. The fluid travels through the fluid coupling and exits the torque converter through passage C, then to Passage D of the external cooler block 46. Which unseats the check valve 54 against the bias of the spring 56, and travels to the cooler 28 via passage E.

When the clutch 20 of the torque converter 40 is locked, or applied, by controlling the valve body 32 energizing the lockup solenoid 80, stroking lockup valve 81, directing line pressure to switch valve 34, thereby stroking the switch valve 34, line pressure is directed to passage A, causing the piston 19 in the torque converter 40 to move rearward, away from the front cover 22, to apply the clutch 20. When the switch valve 34 is stroked, passage B is opened to exhaust oil to the sump 36. Simultaneously, the former charge pressure is directed to passage F of the external cooler block 46, and unseats or unchecks the valve 60 against the bias of spring 62, and travels to the cooler 28 via the passage E. At the same time, the orifice 52 in the path 48 between passages D and F allows a controlled amount of charge pressure to back-feed the torque converter 40 through passage C and exit through passage B and exhaust to the sump 36 via the valve body 32. This fluid flow lowers the charge pressure inside the torque converter 40 while the piston 19 is applied. Piston 19 has equal surface area on both the front and rear surfaces, such that the charge pressure resists the apply pressure against the piston, which minimizes or reduces the force holding the clutch 20. This reduced charge pressure also lubricates the clutch 20 and other internal components. Stroking the switch valve 34 is used during lock-up of the clutch 20, so as to lower charge pressure.

Figure 10:
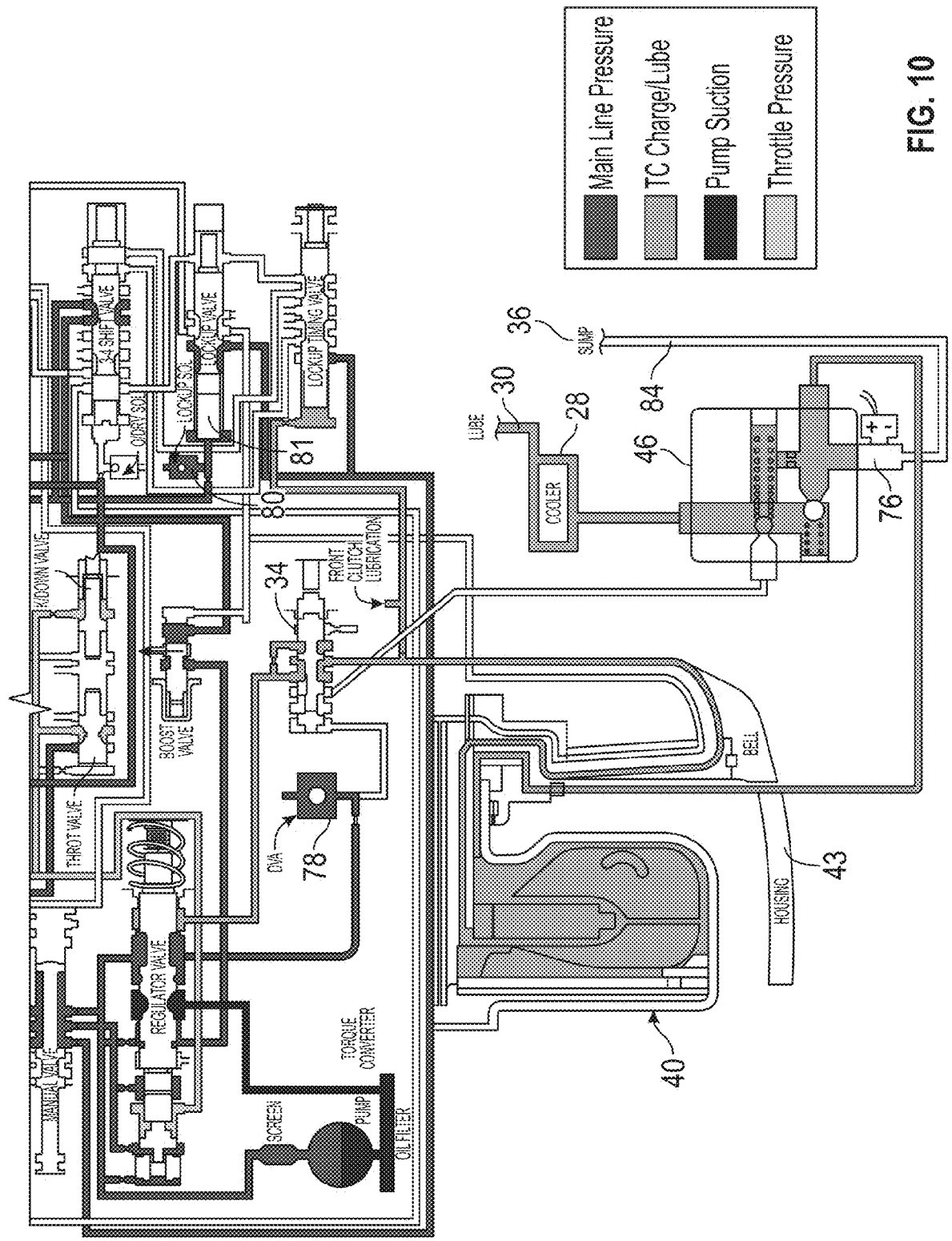
FIG. 10 is a hydraulic circuit schematic for an alternative embodiment of the present invention having a dump valve in the off position and the clutch unlocked.
Figure 11:
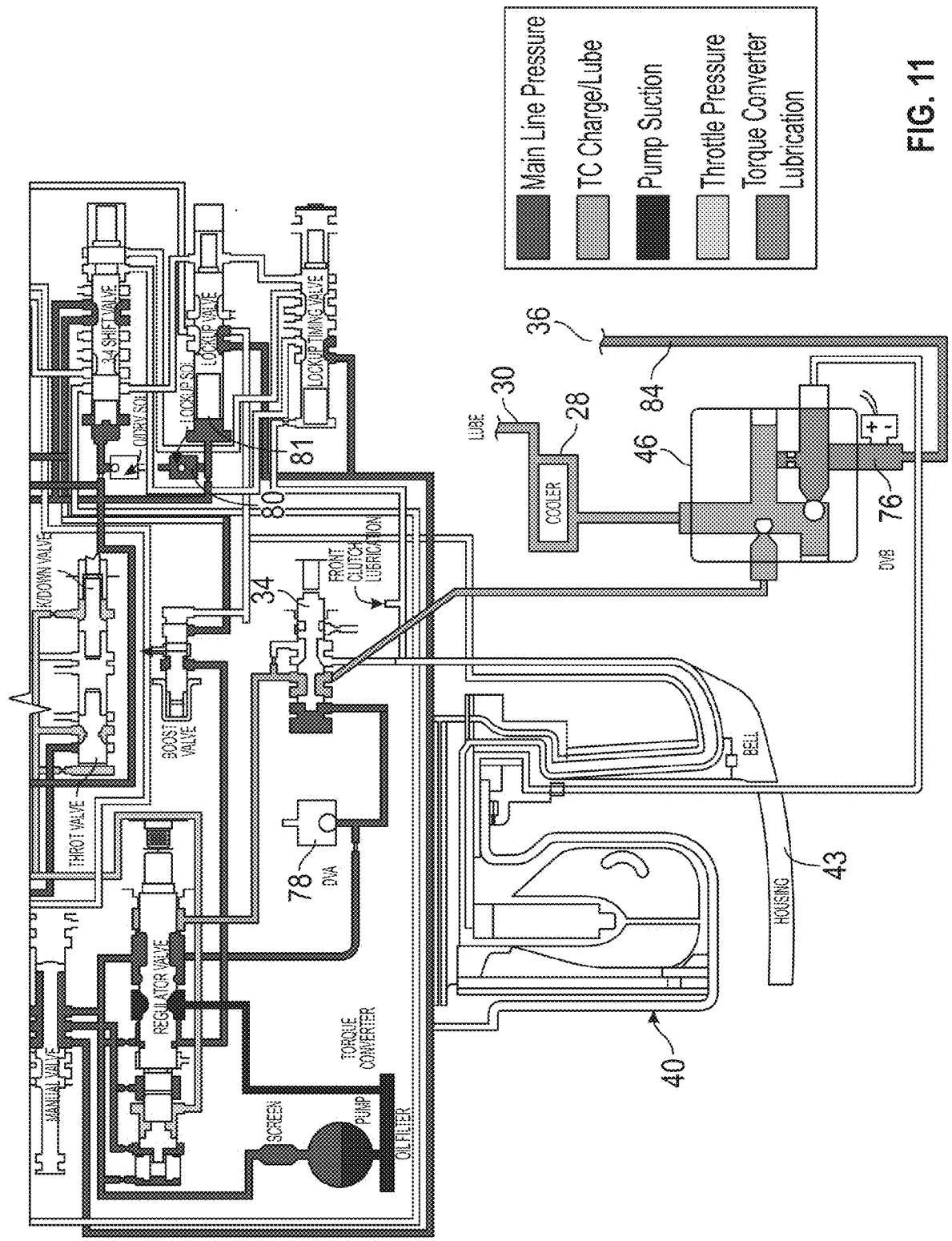
FIG. 11 is a hydraulic circuit schematic of the alternative embodiment with the dump valve on and the clutch unlocked.

In an alternative embodiment shown in FIGS. 10 and 11, a dump valve system comprised of a solenoid 78 and a solenoid valve 76 is used to drain oil from the torque converter 40, thereby effectively raising the stall speed of the torque converter when more engine RPM is needed to spool a turbocharger. A dump valve system cannot be used with the conventional torque converter 10, since the oil pressure therein is needed to keep the clutch 20 in the released position. Draining the conventional torque converter 10 causes the clutch to drag, thereby increasing friction and heat which leads to failure of the clutch. The three-passage hydraulic system of the torque converter 40 does not have such a failure problem with the use of a dump valve system, because the piston 19 is naturally held in the unlocked position regardless of the amount of charge pressure. Adding the dump valve system to the hydraulic system of the torque converter 40 requires modification of the valve body by separating the clutch lockup circuit from the circuit that strokes the switch valve 34. The modification includes addition of a new lockup feed hole 126 in the lower separator plate 124B and elimination of the corresponding holes 120, 121 and 128 in the prior art lower separator plate 124 necessary for operation in the plate. See FIGS. 17A,C. An oil path 130 (FIG. 14B) is milled on one side of the valve body channel casting 126B to direct lock up oil to passage A and an oil path is created on the other side of the valve body channel casting 126B to direct charge pressure to passage B. The corresponding holes 118 and 119 from prior art main separator plate 122 are eliminated as necessary for operation. Additionally, a solenoid feed orifice 134 is added to the valve body main casting 131 to feed DVA solenoid 78. Then an oil circuit 135 is created in the main casting, routed through prior art hole 136 and prior art boost tube 139 to the lower casting where the continuing oil circuit is fed to the DVA solenoid 78 via pipe fittings and an aluminum block 145 which the solenoid 78 is bolted to. A hole 138 is eliminated in the lower casting 137A to maintain the circuit (FIGS. 20A, B).

When the dump valve system is included in the hydraulic system of the torque converter 40, a solenoid 78 is added to the valve body 32 to control the movement of the switch valve 34, while the existing torque converter clutch solenoid 80 is used to direct oil to apply the clutch 20. A second solenoid valve 76 is also added to the circuit and attached to the external cooler block 46 and connected to the oil passage D, which then has an external fluid line 84 that drains to the sump 36 through the side of the transmission pan.

Figure 12:
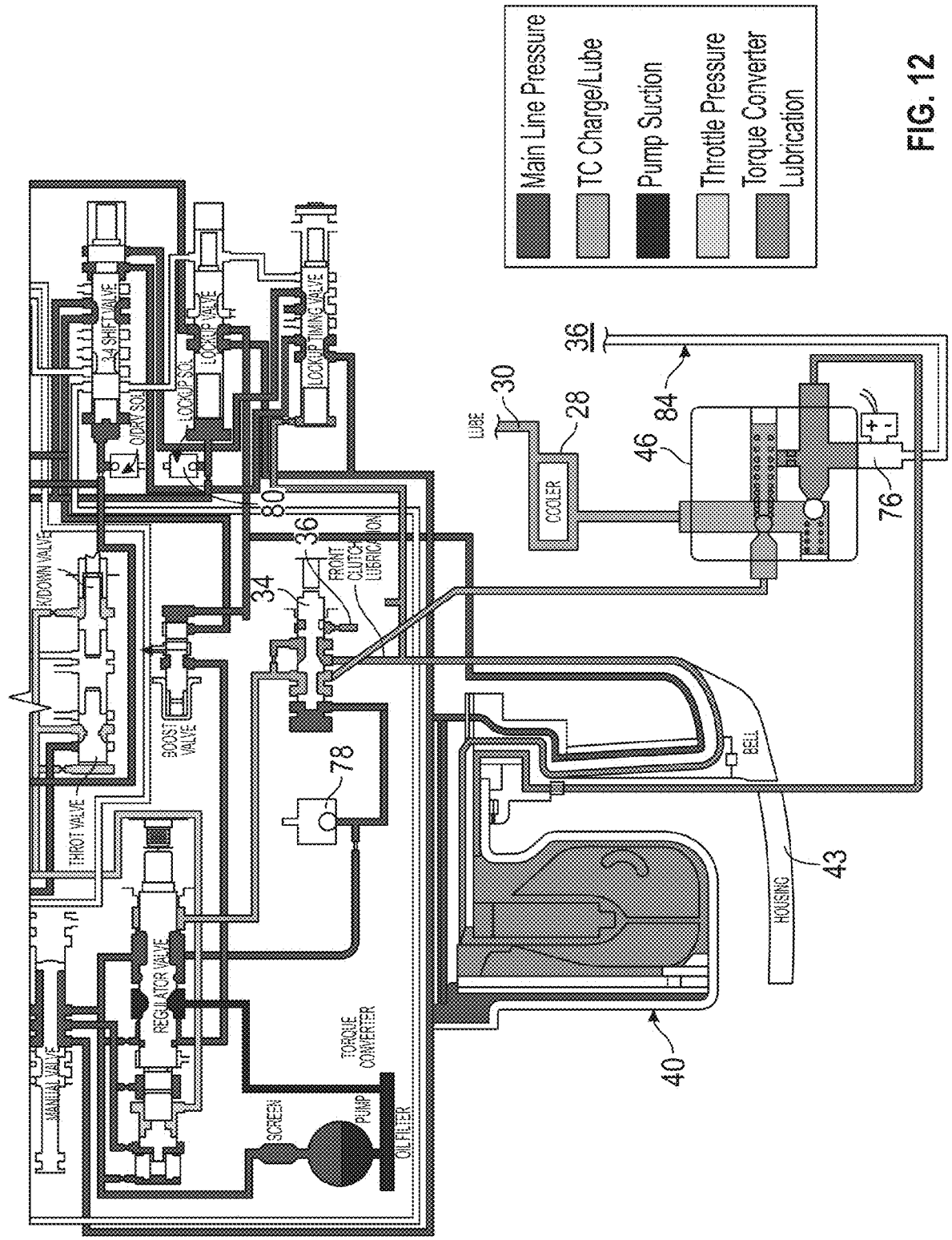
FIG. 12 is a hydraulic circuit schematic of the alternative embodiment with the clutch locked.
Figure 13:
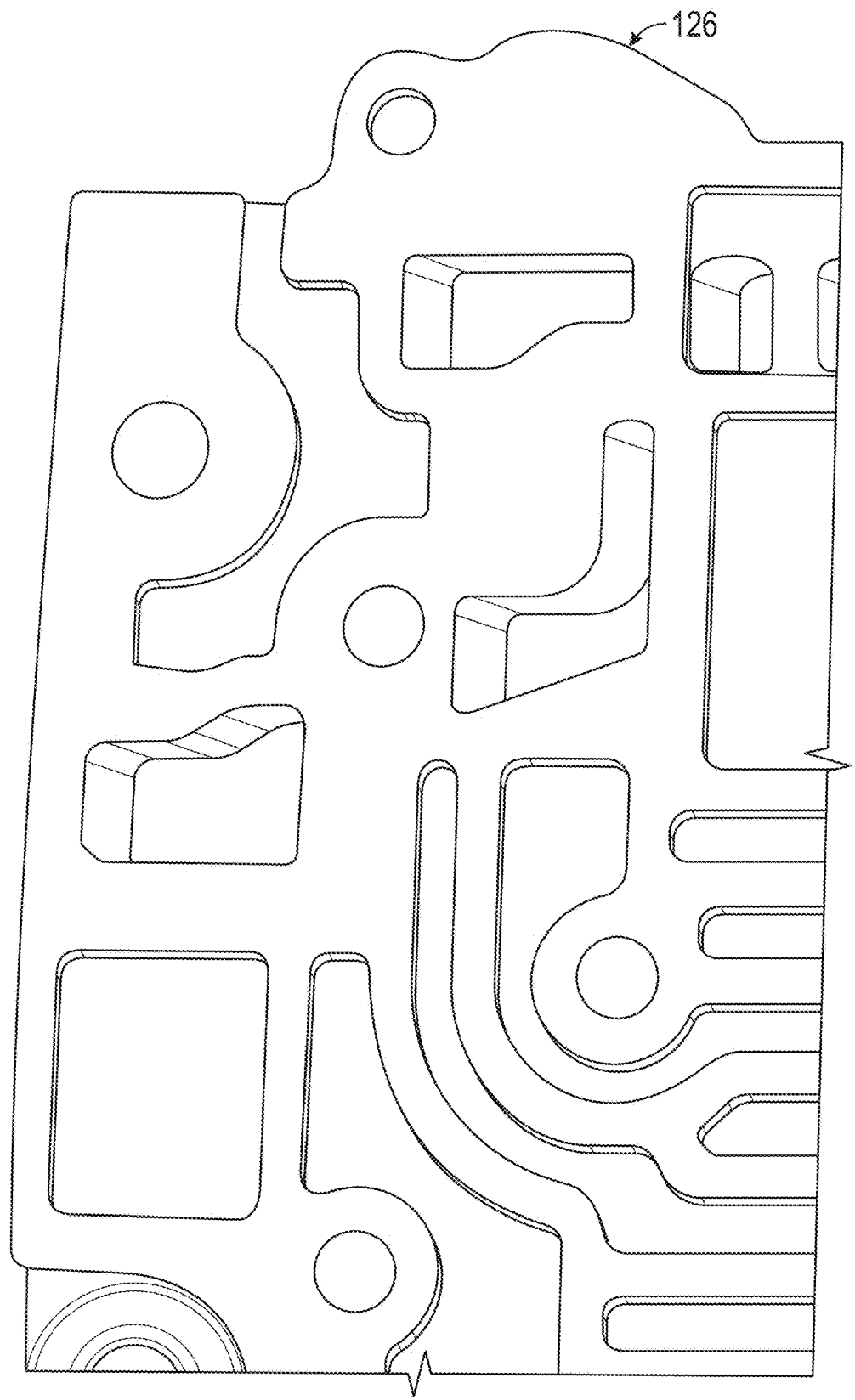
FIG. 13 shows a portion of the prior art valve body channel casting.

When the clutch 20 of the torque converter 40 is not applied, the operation of the dump valve system is hydraulically the same as the non-dump valve system. When the clutch 20 of the torque converter 40 is applied, or locked up, both the solenoids 78 and 80 are energized to achieve the same hydraulic flow as a non-dump valve system as shown in FIG. 12. The clutch solenoid 80 is electrically connected to the DVA solenoid 78 with a diode that allows electricity to flow in only one direction, from the solenoid 80 to the solenoid 78, but not the reverse direction from the solenoid 78 to the solenoid 80.

When the full dump valve system is utilized, both the solenoids 78, 76 are energized. This causes the switch valve 34 to stroke, opening the passage B to exhaust, and directing the charge pressure to the external control block 46 passage F. While some of this oil passes through the orifice 52 of the control block 46, the solenoid valve 76 is open and allows this oil to exhaust to the sump 36 through a fluid line 84 connected to the transmission pan, as seen in FIG. 11. Utilizing both solenoids 78, 76 causes all the charge pressure to drain, and has the greatest increase in stall RPM. The wiring of the solenoids 78, 76 allows solenoid 78 to be energized without energizing solenoid 76, to fill the converter 40 with a small amount of charge pressure, thus allowing the dump valve system to be used in two stages, which is desirable in some racing applications.

With the three-passage torque converter 40, apply pressure is contained between the front cover 22 and the piston 19, thereby leaving the impeller 12 free from potential ballooning damage. The three-passage torque converter 40 also allows for lube grooves to be used in the clutch pack friction plates 20. The piston 19 of the three-passage torque converter 40 is normally kept in the released position by the charge pressure. Also, the three-passage torque converter 40 does not rely on the changing of converter flow directions for lockup of the clutch 20, so there is no potential for delayed engagement of the clutch 20. The three-passage torque converter 40 allows fluid circulation at all times so as to reduce internal temperatures of the torque converter. In the prior art torque converter 10, all internal areas, except for the cavity between the piston 19 and the front cover 22, are subjected to the full lockup pressure. In comparison, the torque converter 40 applies the full lockup pressure only to the cavity between the piston 19 and the front cover 22. In the alternative embodiment utilizing a dump valve, the three-passage torque converter 40 can have the charge pressure drained, to increase the stall speed while spooling a turbocharger, without causing damage to the clutch 20.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art. The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

What is claimed is:

1. A torque converter for an automobile transmission, comprising:
   a housing;
   an impeller in the housing;
   a turbine in the housing;
   a stator in the housing between the impeller and the turbine, mounted on a stator support tube;
   a lockup clutch in the housing;
   a piston in the housing to apply the clutch;
   an input shaft extending through the stator and the stator support tube;

a hydraulic circuit for circulating oil to and from the housing;

a control block in the hydraulic circuit;

a first passageway through the input shaft to flow oil between the lockup clutch piston and a front cover to apply the clutch when locked and be open to exhaust while the lockup clutch is unlocked;

a second passageway between the input shaft and the stator support tube to supply oil flow to the impeller and the turbine when the lockup clutch is unlocked and from the impeller and the turbine when the lockup clutch is locked; and a third passageway between an impeller hub and the stator support tube for oil flow out of the impeller and the turbine to the control block when the lockup clutch is unlocked and to allow for oil flow from the control block into the impeller and the turbine when the lockup clutch is locked.

2. The torque converter of claim 1, wherein the control block includes first, second, and third oil passages and two check valves.

3. The torque converter of claim 2 wherein the first passage of the control block is coupled to the third passageway of the torque converter.

4. The torque converter of claim 3 wherein the second passage of the control block is coupled to a cooler to provide oil flow to the cooler.

5. The torque converter of claim 4 wherein the third passage of the control block is coupled to a front cooler line of a transmission case to provide oil flow to the cooler while the lockup clutch is locked.

6. The torque converter of claim 2 wherein the control block includes an orifice providing fluid flow from the third passage of the control block to the first passage of the control block when the lockup clutch is engaged.

7. The torque converter of claim 1 further comprising a dump valve system to drain oil from the housing.

8. The torque converter of claim 1 wherein the hydraulic circuitry is fluidly connected to the housing and the control block.

9. The torque converter of claim 8 wherein the hydraulic circuitry includes a dump valve system comprising of a switch valve actuated by a solenoid and a solenoid valve.

10. The torque converter of claim 1 wherein the piston applies the lockup clutch in a rearward direction away from the front cover of the housing.

11. A torque converter for an automobile transmission, comprising:

a housing with a front cover;

an impeller, a turbine, a stator, and a lockup clutch in the housing; and a piston in the housing, wherein the piston moves rearwardly away from the front cover to apply the clutch;

a fluid circuit for controlling oil flow and thereby control locking and unlocking of the lockup clutch;

the fluid circuit including a control block having passages and check valves for controlling oil flow through the control block.

12. The torque converter of claim 11 further comprising first, second, and third passageways connected to the housing for directing oil flow to and from the housing.

13. The torque converter of claim 12 further comprising an input shaft, a stator support tube surrounding the input shaft, and wherein the first passageway extends through the input shaft, the second passageway is between the input shaft and the stator support tube, and the third passageway extends around the stator support tube.

14. The torque converter of claim 11 wherein the fluid circuit includes a switch valve, and a first dump valve solenoid associated with the switch valve.

15. The torque converter of claim 14 wherein the fluid circuit includes a second dump solenoid valve associated with the control block.

16. The torque converter of claim 11 wherein a third passageway is fluidly connected to the control block.

17. The torque converter of claim 11 further comprising a cooler fluidly connected to one passage of the control block and connected to a front cooler line of a transmission case by another passage of the control block.

* * * * *